US009310881B2

(12) United States Patent
Hansen et al.

(10) Patent No.: US 9,310,881 B2
(45) Date of Patent: Apr. 12, 2016

(54) METHODS AND APPARATUS FOR FACILITATING MULTI-USER COMPUTER INTERACTION

(75) Inventors: Timothy E. Hansen, Folsom, CA (US); Ashwini Asokan, San Jose, CA (US); Adam Jordan, El Cerrito, CA (US); James W. Lundell, Portland, OR (US); Michael J. Payne, Beaverton, OR (US); Giuseppe Raffa, Portland, OR (US); Rahul Shah, San Francisco, CA (US); Chieh-Yih Wan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 13/614,668

(22) Filed: Sep. 13, 2012

(65) Prior Publication Data

US 2014/0075328 A1   Mar. 13, 2014

(51) Int. Cl.

| | |
|---|---|
| *H04N 5/225* | (2006.01) |
| *H04N 5/445* | (2011.01) |
| *H04N 21/45* | (2011.01) |
| *G06F 3/00* | (2006.01) |
| *G06F 21/00* | (2013.01) |

(Continued)

(52) U.S. Cl.
CPC .............. *G06F 3/011* (2013.01); *G06F 3/0487* (2013.01)

(58) Field of Classification Search
CPC ......... G06F 3/048; G06F 21/00; H04N 5/225; H04N 5/445
USPC ....................................................... 715/747
See application file for complete search history.

(56) References Cited

U.S. PATENT DOCUMENTS

| | | |
|---|---|---|
| 5,384,892 A | 1/1995 | Strong |
| 5,867,817 A | 2/1999 | Catallo et al. |

(Continued)

FOREIGN PATENT DOCUMENTS

| | | |
|---|---|---|
| EP | 2037377 A1 | 3/2009 |
| EP | 2157793 A1 | 2/2010 |

(Continued)

OTHER PUBLICATIONS

International Search Report and Written Opinion received for PCT Application No. PCT/US2013/059320, mailed on Dec. 26, 2013, 10 pages.

(Continued)

*Primary Examiner* — Jennifer To
*Assistant Examiner* — Hugo Molina
(74) *Attorney, Agent, or Firm* — Barre Law Firm, PLLC

(57) ABSTRACT

A data processing system includes components for providing a pleasant user experience. Those components may include a family interaction engine that provides a family channel. The family interaction engine may provide for creation of a user group. The family channel may present content of interest to multiple users in the user group. When a user is detected near the data processing system, the family interaction engine may automatically present content of interest to that user. When used for presenting media content, the data processing system may also cause supplemental data to automatically be presented, wherein the supplemental data is relevant to the media content and to a predetermined interest of the user. The data processing system may also provide a ranked list of applications for potential activation by the user. The applications may be ordered based on the current context. Other embodiments are described and claimed.

15 Claims, 12 Drawing Sheets

(51) Int. Cl.
*G06F 3/048* (2013.01)
*G06Q 30/00* (2012.01)
*G06F 3/01* (2006.01)
*G06F 3/0487* (2013.01)

(56) References Cited

U.S. PATENT DOCUMENTS

| | | | |
|---|---|---|---|
| 6,484,148 B1 | 11/2002 | Boyd | |
| 6,530,083 B1* | 3/2003 | Liebenow | H04N 7/163 348/E7.061 |
| 8,176,437 B1 | 5/2012 | Taubman | |
| 8,635,637 B2 | 1/2014 | Krum et al. | |
| 8,799,635 B2 | 8/2014 | Smith et al. | |
| 2006/0218506 A1 | 9/2006 | Srenger et al. | |
| 2007/0036117 A1 | 2/2007 | Taube et al. | |
| 2008/0005736 A1 | 1/2008 | Apacible et al. | |
| 2008/0027909 A1 | 1/2008 | Gang et al. | |
| 2008/0184146 A1 | 7/2008 | Kimball et al. | |
| 2009/0254838 A1* | 10/2009 | Rao et al. | 715/749 |
| 2009/0299960 A1 | 12/2009 | Lineberger | |
| 2010/0049719 A1 | 2/2010 | Payne et al. | |
| 2010/0332668 A1 | 12/2010 | Shah et al. | |
| 2011/0022477 A1* | 1/2011 | Hatridge | G06Q 30/0271 705/14.67 |
| 2011/0113041 A1 | 5/2011 | Hawthorne et al. | |
| 2011/0145040 A1 | 6/2011 | Zahn et al. | |
| 2011/0317872 A1 | 12/2011 | Free | |
| 2012/0015624 A1 | 1/2012 | Scott et al. | |
| 2012/0023157 A1* | 1/2012 | Roth et al. | 709/203 |
| 2012/0042317 A1 | 2/2012 | Nguyen et al. | |
| 2012/0066602 A1* | 3/2012 | Chai | G06F 3/04817 715/733 |
| 2012/0150636 A1 | 6/2012 | Freeman et al. | |
| 2012/0189204 A1 | 7/2012 | Johnson et al. | |
| 2012/0254992 A1* | 10/2012 | Levien | G06F 21/32 726/21 |
| 2012/0317498 A1 | 12/2012 | Logan et al. | |
| 2013/0085860 A1 | 4/2013 | Summers et al. | |
| 2013/0088484 A1 | 4/2013 | Marra et al. | |
| 2013/0088605 A1* | 4/2013 | Quarfordt et al. | 348/207.1 |
| 2013/0088650 A1* | 4/2013 | Rouady | H04N 21/4432 348/734 |
| 2013/0097695 A1* | 4/2013 | Sipe | G06F 9/4451 726/17 |
| 2013/0138585 A1 | 5/2013 | Forte | |
| 2013/0144915 A1* | 6/2013 | Ravi | G06F 17/30035 707/785 |
| 2013/0145447 A1 | 6/2013 | Maron | |
| 2013/0145457 A1* | 6/2013 | Papakipos | G06F 21/6245 726/19 |
| 2013/0159930 A1 | 6/2013 | Paretti et al. | |
| 2013/0160141 A1* | 6/2013 | Tseng | G06F 21/6245 726/28 |
| 2013/0173513 A1 | 7/2013 | Chu et al. | |
| 2013/0191397 A1 | 7/2013 | Avadhanam et al. | |
| 2013/0191786 A1* | 7/2013 | Kuo | G06F 21/36 715/846 |
| 2013/0204825 A1 | 8/2013 | Su | |
| 2013/0326353 A1 | 12/2013 | Singhal | |
| 2014/0013419 A1* | 1/2014 | Chen | G06F 21/31 726/17 |
| 2014/0075351 A1 | 3/2014 | Hansen et al. | |
| 2014/0075352 A1 | 3/2014 | Hansen et al. | |
| 2014/0075385 A1 | 3/2014 | Wan et al. | |

FOREIGN PATENT DOCUMENTS

| | | |
|---|---|---|
| WO | 2006/062695 A2 | 6/2006 |
| WO | 2007/104026 A2 | 9/2007 |
| WO | 2009/124212 A1 | 10/2009 |
| WO | 2010/141172 A1 | 12/2010 |
| WO | 2011/002550 A | 1/2011 |
| WO | 2011/163481 A2 | 12/2011 |
| WO | 2014/043280 A1 | 3/2014 |
| WO | 2014/043285 A1 | 3/2014 |

OTHER PUBLICATIONS

International Search Report and Written Opinion received for PCT Application No. PCT/US2013/059327, mailed on Dec. 26, 2013, 11 pages.
Hughes, Neil, "Apple says lack of multi-user support on iPad is a 'known issue,' 'being investigated'", Apple Insider, Retrieved from http://www.appleinsider.com/articles/12/05/07/apple_says_lack_of_multi_user_support_on_ipad_is_a_known_issue_being_investigated.html on Jul. 14, 2012, May 7, 2012, 1 page.
Hughes, Neil, "Apple's future iPhones & iPads could automatically personalize via face recognition", Apple Insider, retrieved from http://www.appleinsider.com/articles/11/12129/apples_future_iphonesipads_could_automatically_personalize_via_face_recognition/ on Jul. 14, 2012, Dec. 29, 2011, 2 page.
Airdrop, "AirDrop—Wikipedia, the free encyclopedia", retrieved from http://en.wikipedia.org/wiki/AirDrop on Jul. 26, 2012, 1 page.
Bump, "Bump (application)—Wikipedia, the free encyclopedia", retrieved from http://en.wikipedia.org/wiki/Bump(application) on Jul. 26, 2012, 3 pages.
Hansen et al., "Methods and Apparatus for Improving User Experience", U.S. Appl. No. 13/614,695, filed Sep. 13, 2012, 94 pages.
Wan et al., "Methods and Apparatus for Improving User Experience", U.S. Appl. No. 13/614,653, filed Sep. 13, 2012, 96 pages.
Hansen et al., "Methods and Apparatus for Improving User Experience", U.S. Appl. No. 13/614,683, filed Sep. 13, 2012, 96 pages.
Wan et al., "Mobile Device Position Detection", PCT Patent Application No. PCT/US2011/068068, filed Dec. 30, 2011, 21 pages.
Asokan et al., "Techniques for Management and Presentation of Content", U.S. Appl. No. 13/381,354, filed Dec. 20, 2010, 41 pages.
Non-Final Office Action received for U.S. Appl. No. 13/614,683, mailed on Nov. 17, 2014, 19 pages.
Non-Final Office Action received for U.S. Appl. No. 13/614,653, mailed on Aug. 14, 2014, 34 pages.
Advisory Action received for U.S. Appl. No. 13/614,653, mailed on Apr. 20, 2015, 5 pages.
Non-Final Office Action received for U.S. Appl. No. 13/614,695, mailed on Apr. 23, 2015, 12 pages.
Final Office Action received for U.S. Appl. No. 13/614,653 mailed on Jan. 29, 2015, 37 pages.
Notice of Allowance received for U.S. Appl. No. 13/614,683, mailed on Mar. 16, 2015, 10 pages.
International Preliminary Report on Patentability and Written Opinion Received for PCT Patent Application No. PCT/US2013/059320, mailed on Mar. 26, 7 pages.
International Preliminary Report on Patentability and Written Opinion Received for PCT Patent Application No. PCT/US2013/059327, mailed on Mar. 26, 2015, 6 pages.
Non-Final Office Action received for U.S. Appl. No. 13/614,653, mailed on Nov. 23, 2015, 28 pages.
Final Office Action received for U.S. Appl. No. 13/614,695, mailed on Nov. 4, 2015, 12 pages.

* cited by examiner

| Application Activation Matrix 95 ||||||
|---|---|---|---|---|---|
| Semantic Location | Time | Activity | Current Application | Next Application | Transition Probability |
| Any | Any | Driving | Any | Map | 0.7 |
| Any | Any | Driving | Any | Email | 0.1 |
| Airport | Flight boarding time (from calendar) | Sedentary | Any | Airplane Mode Widget | 0.97 |
| Airport | Noon | Sedentary | Any | Travel | 0.8 |
| Airport | Meal Time | Any | Travel | Food Recommendation | 0.8 |
| Bus Stop | Any | Sedentary | Any | Solitaire Game | 0.9 |
| Bus Stop | Any | Sedentary | Any | E-book Reader | 0.8 |
| ... ||||||

FIG. 12

METHODS AND APPARATUS FOR FACILITATING MULTI-USER COMPUTER INTERACTION

TECHNICAL FIELD

The present disclosure relates in general to data processing systems. More particularly, the present disclosure relates to technology for improving the experience of users interacting with data processing systems.

BACKGROUND ART

People use data processing systems for many different purposes. Some types of data processing systems (e.g., "smartphones") are typically used by a single person. Other types of data processing systems may have multiple users. For instance, two roommates may share a personal computer, or a whole family may share a tablet computer ("tablet"). When multiple users share a data processing system, however, the data processing system may easily get cluttered with content that interests one of the users but not the other user or users.

A conventional data processing system may require that a different user account be created for each different user, and users may be required to sign in with credentials (e.g., a user identifier ("userid") and a password) before the data processing system will allow access to any content. Such a data processing system may maintain a different user profile for each different user account. A user profile may include a collection of data items for personalizing the data processing system for the associated user. For instance, a user profile may include many different kinds of configuration settings for the user, including settings that have been manually created and/or configured by the user, and settings that have been automatically created and/or configured by the data processing system. The user profile may also identify which content items are available to the user.

In one example usage scenario, a mother, Mary, acquires a conventional tablet to be used by herself, her husband, Joe, her son, Ned, and her daughter, Amy. Mary may intend for the tablet to be frequently used by different members of the family. For instance, Mary may intend for the tablet to be used more like a television than a smartphone. However, if Mary creates a different user account for each member of the family, it may be difficult or impossible for the users to perform some kinds of actions with the tablet. For example, it may be difficult for one user to share content with all of the other users.

On the other hand, if Mary creates only a single user account to be shared by all four users (or if the tablet does not allow for the creation of user accounts), the tablet is likely to get cluttered with content, as indicated above. It may also be difficult or impossible to protect any of the content from any individual user or users. In addition, if one of the users changes the password for the shared user account, the other users could get locked out.

Mary might also create five different user accounts, with four of the accounts assigned to individuals, and with one of the accounts to be shared by all four users. (E.g., Mary might create accounts with the following userids: Mary, Joe, Ned, Amy, and Shared.) However, that type of configuration could also present numerous difficulties and disadvantages, as described in greater detail below. Furthermore, there may be times when Mary would like to use the tablet with Ned and Amy, but not with Joe, making the shared user account an inappropriate choice.

Another challenge associated with some multi-user and single user data processing systems pertains to the large number of applications that may be loaded into a data processing system, and the difficulty of finding a shortcut to any particular application when desired. For example, some platforms simply list all applications in alphabetical order. Other platforms may provide a list of recently used applications.

Additional challenges are associated with functions like sending content or other information from one device to another. Conventional devices address some, but not all, of those challenges. For instance, a conventional smartphone allows a user to share contact information from an address book with another smartphone. Also, a conventional smartphone allows a user to share other types of information with another smartphone via near field communication (NFC) technology. But with NFC technology, the communicating devices must be touching or very close to each other—typically within four centimeters. Other existing methods for sharing contact information and/or other types of information are provided by technologies such as short message service (SMS), the social networking services known as "LinkedIn" and "FaceBook," devices that run on the operating system known as "Android," the file format referred to as "vCard," and one or more services provided over the Internet by Google, Inc ("Google"). For instance, Facebook and Google provide contact synchronization mechanism for mobile phones. Patent Cooperation Treaty (PCT) patent application serial number PCT/US11/68068, entitled "Mobile Device Position Detection," describes techniques for transmitting information from a first device to a second device based on user input related to the relative position of the first device with respect to the second device.

BRIEF DESCRIPTION OF THE DRAWINGS

Features and advantages of the present invention will become apparent from the appended claims, the following detailed description of one or more example embodiments, and the corresponding figures, in which:

FIG. 12 presents an example application activation matrix.

DESCRIPTION OF THE EMBODIMENTS

Figure 1:
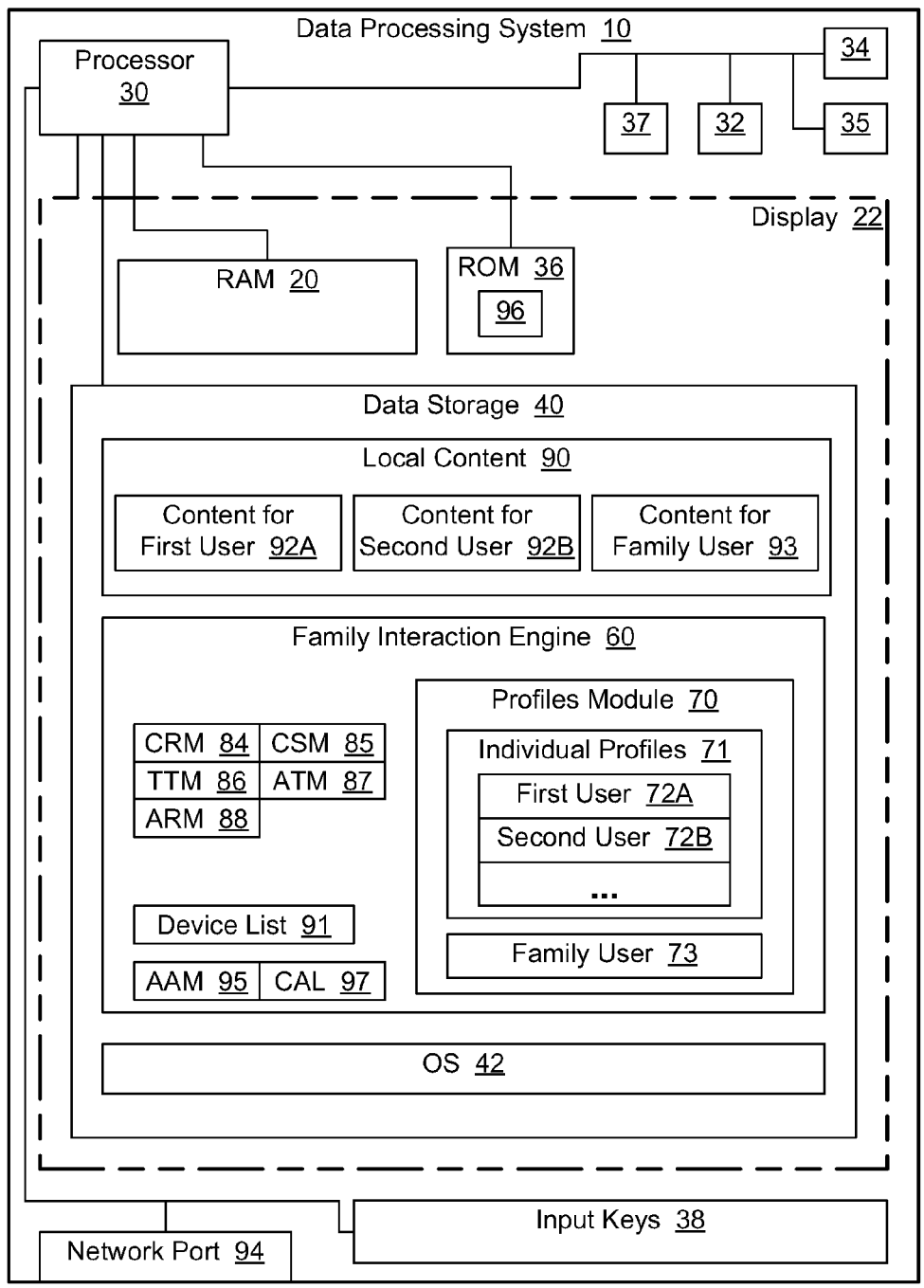
FIG. 1 is a block diagram of a data processing system with a family interaction engine according to an example embodiment.
Figure 1:
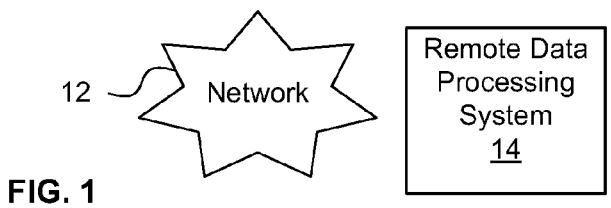

If a data processing system is configured with only one user account, and that account is to be shared by multiple users, the data processing system may become cluttered with a collection of applications, icons, and other content that is not optimized for any particular user. One area where such clutter may be particularly problematic may be the main user interface or home screen of the data processing system. A user may try to reduce the clutter by manually grouping some items into specific folders or onto specific screens. However, this grouping may not be automatic. Consequently, as new content is introduced to the data processing system, the manual process of grouping content items may become difficult and inefficient. Furthermore, a manual grouping by one user may not be suitable for another user or for a group as a whole.

If a data processing system is to be used by a group, the data processing system may be configured with a different user account for each user and with a shared user account to be shared by all of the users. Any individual logged in to the shared account may adjust the user profile for the shared account and may attempt to manually organize the content in a way that is pleasing to all members of the group. For instance, this kind of configuration may be used for a tablet to be shared by members of a family. When a user is logged in to his or her individual user account, user interactions may cause changes to be made to the user profile associated with that individual user account. However, a conventional tablet does not adjust a shared user profile in response to changes in individual user profiles. Consequently, if a user wants the changes that were made to his or her individual user profile to also be reflected in the shared profile, the user may need to log in to the shared account and then repeat the user interactions which caused the desired changes to the individual profile.

A data processing system may tailor its content according to the user profile of the current user. For instance, a video streaming application may suggest documentary videos for viewing by the current user if the user profile for the current user indicates that the current user has a preference for videos from that genre. However, if one or more additional individuals want to watch a video on the data processing system with the current user, the data processing system may be unable to suggest content that is appropriate for all of those individuals. This may be the case even if the application has access to the user profiles for all of the individuals that want to watch a video.

One user may want to send a message to, or otherwise share content with, any or all of the other individuals who use a shared data processing system. A user may share content by using an email application or a social networking application to present other users with the content or with a hyperlink to the content, for example. Alternatively, another application (e.g., a music player or news reader) may provide options to share content via social networking or email applications. However, these methods may require steps that are so time consuming or inconvenient as to discourage sharing of content. For instance, before a user can use the sharing option of a music player, the user may need to sign in to a social networking application. Furthermore, sharing through social networks is often done in a broadcast manner, as opposed to targeting specific individuals. Alternatively, using email or a social network to send content may require the sender to know the intended recipient's email address or userid on the social networking application.

The present disclosure involves a group interaction engine that provides data processing systems with improved facilities for handling user interactions. For instance, the group interaction engine may provide improved facilities for interactions among multiple individual users. An example of a data processing system that may be used by multiple individuals is a tablet. In an example embodiment, the group interaction engine runs on a tablet to be used by multiple members of a family. Accordingly, the group interaction engine may also be referred to as a family interaction engine.

The family interaction engine may provide for individual user accounts. The family interaction engine may also provide for a different type of user account, known as a collective user account. The family interaction engine may cause the collective user account to by tied or linked to specific individual user accounts. As described in greater detail below, the collective account may be referred to as a family user account. The family interaction engine may also provide for individual user profiles associated with the individual user accounts, and for a family user profile associated with the family user account.

When the family user account is open, the family interaction engine may automatically provide the tablet with a main user interface that includes content of interest to multiple users. For purposes of this disclosure, an account is considered to be open if the account is in control of the data processing system. For instance, when a user logs in to his or her individual user account, that account becomes open. Similarly, an account that does not require logging in may be considered open when that account is in control. For instance, a data processing system may be configured to automatically boot to the family user account. Consequently, the data processing system could open the family user account without anyone logging in. Also, if an account is open, the corresponding profile is also considered to be open.

The main user interface that includes content of interest to multiple users may be referred to as a home screen. All of the content for the home screen may or may not fit on the screen at once. Accordingly, the home screen may span multiple pages. (The different pages of the home screen may also be referred to as a first screen, a second screen, etc.) Users may move from page to page using a swipe gesture or any other suitable technique. For purposes of this disclosure, unless explicitly provided otherwise, any reference to a swipe gesture should also be understood as covering a flick gesture, and vice versa.

The home screen for the family user and the associated features and functionality may be referred to as a family channel. The family interaction engine may enable the tablet to dynamically and automatically present and organize content in the family channel in a way that is tailored to the family as a collective. The family interaction engine may determine layout and content for the family channel based at least in part on the family user profile. In addition, the family interaction engine may automatically update the family user profile, in response to changes to, or other actions associate with, one or more individual user profiles. For instance, the family interaction engine may update the family user profile according to an analysis that takes into account behaviors and preferences recorded for the family user account, as well as behaviors and preferences for each of the individual user profiles. Thus, the family interaction engine automatically uses actions within individual user accounts to determine content for the family channel. The family interaction engine may thereby enable the tablet to dynamically display content that is appropriate for the entire family.

For purposes of this disclosure, the noun "content" refers to music files, video files, picture files, icons, software applications, email messages, text messages, documents, spreadsheets, presentations, and other types of data that may be stored on, accessed by, and/or presented by a data processing system.

The family interaction engine may cause the family channel to be displayed automatically when the family account is open. In addition, in some situations, the family interaction engine may cause the family channel to be displayed when an individual user account is open. For example, if an individual user account is open, the family interaction engine may cause the family channel to be displayed when the tablet is docked, charging, or in some other idle or passive mode (e.g., if the open user account has not been used for a predetermined period of time). Similarly, the family interaction engine may cause the data processing system to display the family channel when all users are logged out. In addition, the family interaction engine may provide the family channel with different kinds of content, depending on whether the family account is open, an individual user account is open, or no user account is open.

In addition, the family interaction engine may automatically detect when users are in close proximity to the tablet, based on data from a camera and/or other sensors. For example, as described in greater detail below, the tablet may include a camera, and the family interaction engine may determine that a user is near the tablet based on data received from the camera. When one or more users are detected near the tablet, the family channel may display recommendations that are tailored to the user or combination of users that have been detected. The family interaction engine may also allow a user to manually identify one or more other users as interested, and in response to the addition of additional interested users, the family interaction engine may dynamically adjust the recommendations so that they are appropriate for all of the interested users.

The family interaction engine may also allow for users to instantly send messages directly to, or otherwise share content with, other users that share the tablet, including the family account. The shared content can be viewed either on the shared tablet or on a device that belongs to the other user.

A shared tablet may frequently be handed from one user to another. If the first user happens to already be logged in to the account that the second user intends to use, the second user may easily access the desired content. Otherwise, with a conventional tablet, a cumbersome and inefficient process may be required to log the first user out and to log the second user in to the desired account. By contrast, according to the present disclosure, the family interaction engine may automatically determine which user is holding the tablet, and the family interaction engine may automatically change the user interface and the open user account in response to detecting that the tablet has been handed from one user to another. More details concerning the types of operations that may be performed when the tablet is handed from one user to another are provided below, with regard to FIG. 8.

Also, when the tablet is being used to present media content, the family interaction engine may determine which user is currently interacting with the tablet, and the family interaction engine may cause the tablet to display supplemental data that is relevant both to the media content and to a predetermined interest of the current user. The family interaction engine may then determine that a second user is interacting with the tablet. In response, the family interaction engine may cause the tablet to display new supplemental data that is relevant to the media content and to a predetermined interest of the second user.

The family interaction engine may also automatically detect whether a person is near the tablet, and when a known user is detected near the tablet, the family interaction engine may automatically select content to be displayed on the tablet, based at least in part on the user profile for the detected user.

The family interaction engine may also present context-aware smart shortcuts to applications. For instance, the family interaction engine may use context data and user input to rank applications by their probabilities of activation, and the family interaction engine may present shortcuts to those applications according to their ranked order of predicted activation.

FIG. 1 is a block diagram of an example embodiment of a data processing system with a group interaction engine. In the embodiment of FIG. 1, the data processing system (DPS) 10 is a tablet that has at least one central processing unit (CPU) or processor 30, with random access memory (RAM) 20, read-only memory (ROM) 36, data storage 40, and a display 22 responsive to the processor. The ROM may contain a basic input/output system (BIOS) 96. The data storage may contain an operating system (OS) 42, local content 90, and various other items. Various other components, such as motion/orientation sensors 32, a camera 34, a microphone 35, a fingerprint scanner 37, input buttons or keys 38, a network port 94, etc., may also be coupled with the processor. The tablet may connect to or communicate with one or more remote data processing systems 14 via the network port and one or more networks 12, which may include local area networks (LANs) and/or wide area networks (WANs) (e.g., the Internet). The processor may receive information from the input keys, the display (which may be implemented as a touch screen monitor), the microphone, the camera, the fingerprint scanner, and/or from other components.

In the embodiment of FIG. 1, the group interaction engine is referred to as a family interaction engine 60, and some or all of the family interaction engine is stored in data storage. The family interaction engine may include a content recommendation module (CRM) 84, a content sharing module (CSM) 85, a tablet transfer module (TTM) 86, an application tailoring module (ATM) 87, and an application ranking module (ARM) 88. Parts of the family interaction engine (including, without limitation, a main routine, the content recommendation module, the content sharing module, the tablet transfer module, the application tailoring module, and the application ranking module) may be copied to RAM and executed by the processor. As described in greater detail below, the family interaction engine may also include a variety of tables, matrices, files, or other data structures to contain information that helps the family interaction engine to provide a good user experience, such as a device list 91, an application activation matrix (AAM) 95, and a context application list (CAL) 97.

As suggested above, the family interaction engine may enable the owner or administrator of the tablet to create different user accounts for different individual users. The accounts for individual users may be referred to as individual user accounts. When an individual user account is created, the family interaction engine may also automatically create a corresponding user profile, which may be referred to as an individual user profile. A user profile may include (a) the user's login credentials, application data, and tablet settings, (b) user data identifying the user's preferences, interests, content items (e.g., media files and applications), and (c) other information pertaining to the user. The login credentials in the individual user profile may include credentials for the tablet, as well as credentials for any applications on the tablet requiring login credentials. Similarly, the other information pertaining to the user in the user profile may include data for the OS on the tablet, data for applications on the tablet, and data for remotely hosted applications, websites, or other services. The tablet may determine how the home screen for the user should be configured, based on the user's profile. As shown in FIG. 1, the family interaction engine may store the individual user profiles 71 in a profiles module 70. For instance, in one scenario, the tablet of FIG. 1 is to be shared by the following members of a family: a mother, a father, and two children. Accordingly, in the embodiment of FIG. 1, the profiles module contains a first user profile 72A for the mother, a second user profile 72B for the father, as well as additional individual user profiles (indicated by ellipses) for the two children.

The family interaction engine may also provide for a collective user account and a corresponding collective user profile. The family interaction engine may enable the owner or administrator of the tablet to create the collective user account and link that account with multiple specific individual user accounts. When the collective user account is created, the family interaction engine may also automatically create the corresponding collective user profile.

In some embodiments, the collective user account may be created before any individual user accounts, or the collective user account may be created automatically in connection with creation of the first individual user account. For example, in one embodiment, the first account created on the tablet may be an administrator account, and the family interaction engine may use that account as the initial foundation of the collective user account. Subsequently, as additional individual user accounts are added to the tablet, the family interaction engine may automatically link those account to the collective account, as well. In one embodiment, the family interaction engine automatically treats every individual user account as a part of the collective user account, and the family interaction engine therefore automatically links each individual user account to the collective user account.

However, the family interaction engine may also provide for an independent guest account that is not associated with the collective user account. The family interaction engine may also provide for an independent administrator account that is not linked to the collective user account, and the family interaction engine may create the collective user account in connection with creation of the second individual user account. The family interaction engine may also provide an opt-out option that can be selected to prevent individual user accounts from being linked to the family account. If a user opts out, that user's individual preferences will not affect the collective account.

If the operating system (OS) of the tablet supports multiple user accounts, the family interaction engine may cooperate with the OS to create the individual user accounts and the collective user account. For an embodiment where the OS does not support multiple user accounts, the family interaction engine more or less independently controls all accounts except for the administrator individual user account.

As described in greater detail below, the family interaction engine may automatically adjust the collective user profile, based on changes to individual user profiles or other actions associated with the individual user profiles. For example, the family interaction engine may aggregate certain types of information from the individual user profiles into the collective user profile. In various embodiments, collective user accounts may be used for families or for other types of user groups. Accordingly, a collective user account may also be referred to as a group user account or a family user account. Likewise, a collective user profile may be referred to as a group user profile or a family user profile.

The embodiment of FIG. 1 involves a family of users. Accordingly, this disclosure typically refers to family user accounts and family user profiles. For instance, in the embodiment of FIG. 1, the profiles module includes a collective user profile referred to as a family user profile 73. However, a group interaction engine may also provide the same or similar kinds of features for collective user accounts for other types of user groups.

The local content may include content 92A for the first user account, content 92B for the second user account, and content 93 for the family user account. This content may be organized and protected according to the corresponding user profiles.

The family interaction engine may also contain a device list 91 that identifies devices which belong to the members of the family that have user accounts on the tablet. For ease of reference, the members of the family that have user accounts on the tablet may be referred to as the registered family members, the known family members, or simply the family members. Likewise, the devices in the list may be referred to as the registered family devices, the known family devices, or simply the family devices.

Figure 2:
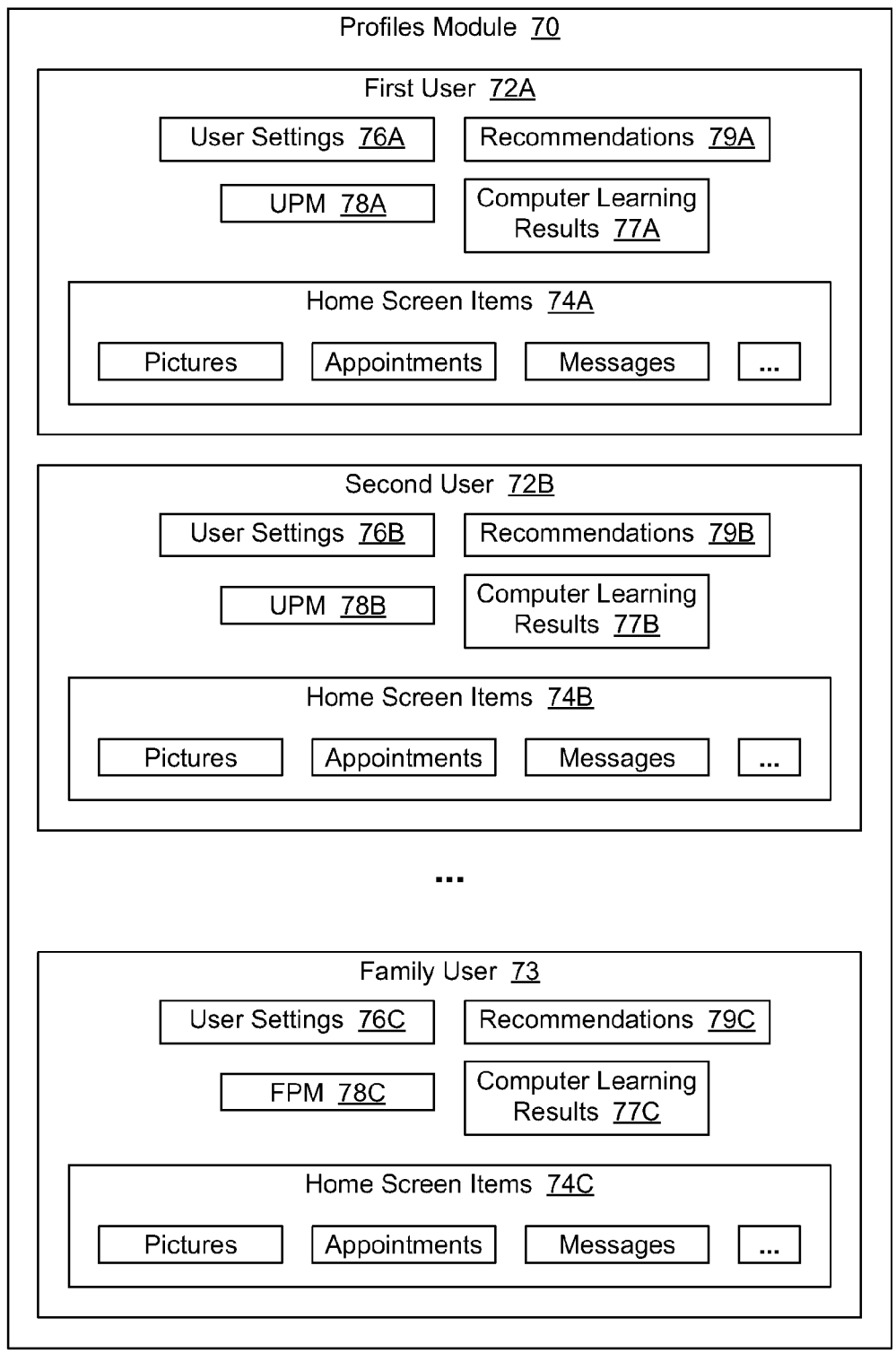
FIG. 2 is a block diagram of a profiles module associated with a family interaction engine according to an example embodiment.

FIG. 2 is a block diagram illustrating the profiles module of FIG. 1 in greater detail. As indicated above, the profiles module may contain multiple profiles, including at least a first user profile 72A, a second user profile 72B, and a family user profile 73. The first user profile may contain a variety of records for providing a user experience tailored to the first user. Those records may include a collection of user settings 76A, a collection of computer learning results 77A, user preference model (UPM) 78A, and a collection of content recommendations 79A. The user settings may include, without limitation, settings that have been manually created and/or configured by the user, and settings that have been automatically created and/or configured by the data processing system. The computer learning results may include, without limitation, data that has been stored by the family interaction engine to identify various preferences of the user, based on previous interactions. The collection of content recommendations may identify recommendations obtained with help from the content recommendation module. The first user profile may also contain data identifying content items to be presented on a home screen or main user interface for the first user. This data may be referred to as a collection of home screen items 74A. The first user profile may also contain data identifying content items associated with the first user, such as local content 92A. When the first user account is open, the family interaction engine may dynamically and automatically present a home screen with pictures, appointments, messages, etc., that are relevant to the first user, based at least in part on the first user's settings, UPM, recommendations, and results learned by the tablet.

Similarly, the second user profile may contain a variety of records for providing a user experience tailored to the second user. Those records may include a collection of user settings 76B, a collection of computer learning results 77B, a UPM 78B, and a collection of content recommendations 79B. The second user profile may also contain data identifying a collection of home screen items 74B for the second user. The second user profile may also contain data identifying content items associated with the second user. When the second user account is open, the family interaction engine may dynamically and automatically present another home screen with pictures, appointments, messages, etc., that are relevant to the second user, based at least in part on the second user's settings, UPM, recommendations, and results learned by the tablet.

Additional user accounts and profiles may be created for additional users (e.g., the two children). For instance, in one scenario, the family interaction engine will contain individual user accounts and individual user profiles for individuals with the following names or userids: "Mom," "Dad," "Jack," and "Jill."

Furthermore, as indicated above, the profiles module may include a family user account and a corresponding family user profile 73. As shown in FIG. 2, the family user profile may contain records like those described above with respect to the individual user profiles, to help provide for a user experience tailored to the family as a collective. Those records may include a collection of user settings 76C, a collection of computer learning results 77C, a family preference model (FPM) 78C, and a collection of content recommendations 79C. The family user profile may also contain data identifying a collection of home screen items 74C for the family user. For purposes of this disclosure, the term "family user" generally refers to whichever user or users is/are interacting with the tablet while the family user account is open. The family user profile may also contain data identifying content items associated with the family user, such as local content 93. When the family user account is open, the family interaction engine may dynamically and automatically present another home screen with pictures, appointments, messages, etc., that are relevant to the family in general, based at least in part on the family user's settings, RPM, recommendations, and results learned by the tablet.

Moreover, since the family interaction engine automatically adjusts the family user profile, based on changes to individual user profiles or other actions associated with the individual user profiles, the family user profile may include a blend of the settings, recommendations, and computer learning results from the profiles for the individual users. As a result, the family user's recommended content items may be tailored to this particular family.

In one embodiment, the home screen for the family account is one aspect of a family channel. The family channel may be controlled by the family interaction engine, and the family channel may serve as a launching point for all members of the family. The family interaction engine may also display the family channel when the tablet is docked or charging, and the family channel may cycle through relevant family content based on the family user profile. Relevant family content may include, without limitation, weather reports, reports on the current location and activity of each family member, notices of upcoming planned family events (potentially via a calendar), media content that may include personal photos or videos, favored external media, favored music, and feeds from social networking sites of interest (e.g., status updates from "friends," text messages from individuals being "followed," etc.). This content may also include applications commonly used under the family account, such as an electronic program guide (EPG), a video-on-demand application, a social networking application, etc. The content may also include news items that have been automatically determined to correspond to shared interests and preferences of the family members. The family interaction engine may also present shared content on the family channel. This shared content may include items that have been shared with the family user by an individual user, such as upcoming calendar items, school news, weather information, or other items. These and other kinds of items may be shared using, for example, the techniques described below.

Other embodiments may provide a group channel or a collective channel with the same or similar features as those described herein with respect to the family channel.

The family interaction engine may also provide one or more application programming interfaces (APIs) that allow other applications on the tablet to access the family user profile and/or individual user profiles. For instance, an API may allow an application to read and modify the family user profile to tailor the family channel user interface to the shared interests of the family. For example, a music player application may access the profile for the currently open account to determine which music files to recommend to the user that is currently signed into the tablet. If an individual user us signed in, and that user's previous behavior indicates a preference for classical music, the application may recommend classical music performances. However, if the family account is open, and past behavior under that account indicates a preference for Broadway musicals, the application may recommend Broadway musicals.

Figure 3:
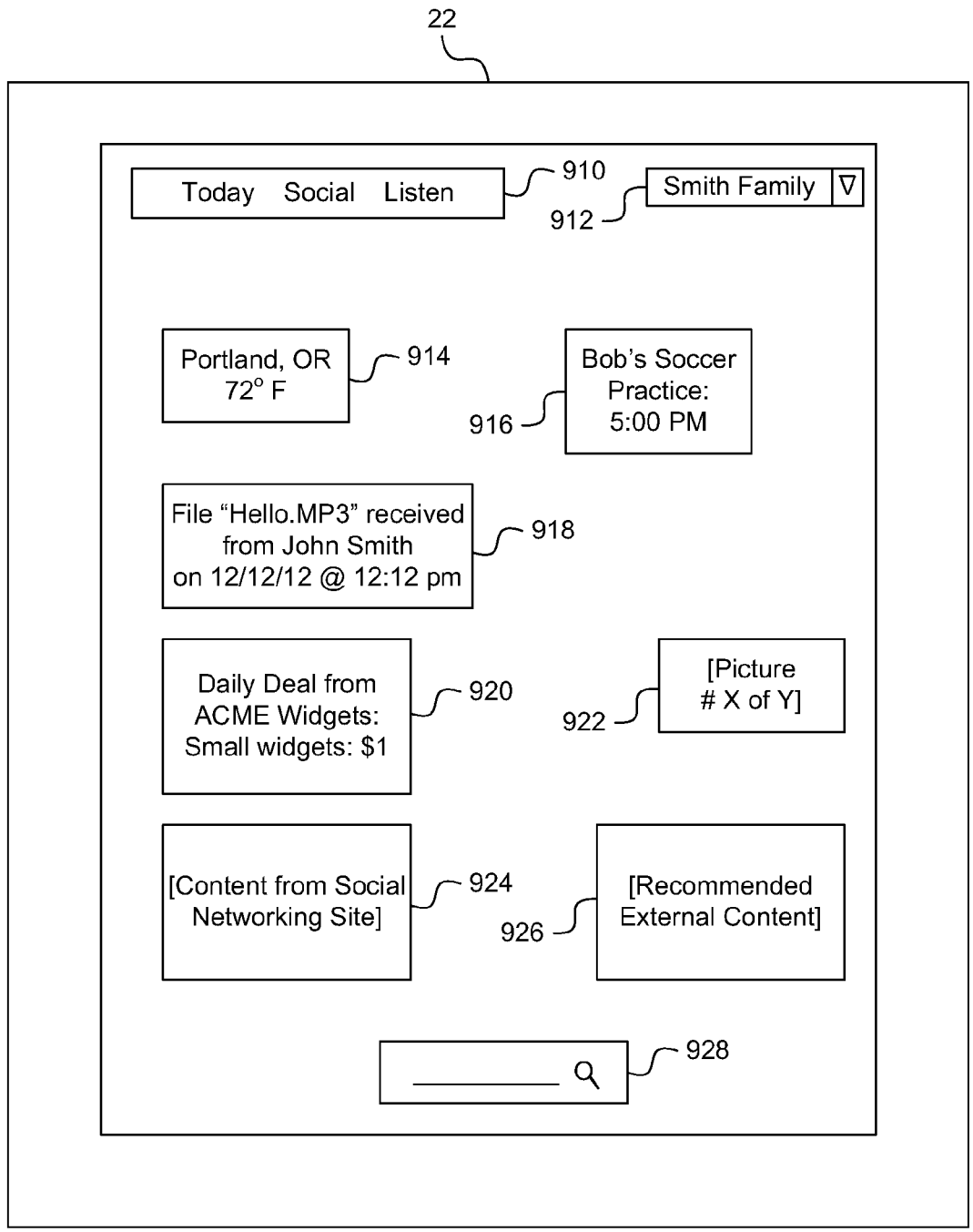
FIG. 3 provides a schematic diagram depicting various content items presented on the display of a data processing system by a family interaction engine according to an example embodiment.

FIG. 3 provides a schematic diagram depicting various content items presented on the family channel on the display of the tablet by the family interaction engine according an example embodiment. As indicated above, those items may be based on an analysis of what content may be relevant to the family as a whole, with regard to the family user profile and the individual user profiles. The content items may include various containers with different kinds of content. For instance, FIG. 3 shows ten containers or objects, including a menu bar 910, a user menu 912, a weather panel 914, a calendar panel 916, a received content panel 918, a shopping panel 920, a picture panel 922, a social networking panel 924, a recommended content panel 926, and a search panel 928.

The menu bar includes buttons or other selectable objects for launching specific applications or functions, such as a calendar application, a social networking application, a music player, etc. The user menu displays which user account is currently open, and provides a drop down list of user accounts which may be selected to open a different account. For instance, the user menu may display thumbnail pictures or icons for each individual family member. Selecting one of the family members from the menu causes the family interaction engine to open that person's individual user account. Alternatively, the family interaction engine may use biometric forms of identification (e.g., face recognition, fingerprint scanning, voice identification, etc.) to automatically determine who is currently holding the tablet, and the family interaction engine may then automatically select or highlight the thumbnail in the user menu for that person.

The weather panel displays weather information for the current location. The calendar panel displays information about upcoming appointments scheduled for the family account. The received content panel provides information about, and a link to, a content item that has been shared with the family account from one of the individual user accounts. For purposes of this disclosure, a link may be a hyperlink, a shortcut, or any other object or item that, when selected, activates or opens the associated content item. The shopping panel displays information about goods or services predicted to be of interest to one or more of the individual users, or information from an application or service that has been configured to send shopping information to the tablet. The picture panel displays a picture predicted to be appealing to the family as a whole. The social networking panel displays information from a social networking application. For instance, the family interaction engine may automatically detect postings that are relevant to two or more of the individual users, and the family interaction engine may automatically display those posts in the social networking panel. The recommended content panel displays information about content predicted to be of interest to the family as a whole. The search panel provides an input field for entering search terms. The family interaction engine may use the family channel as a home screen.

In different embodiments or scenarios, the family interaction engine may omit any of the containers described above. The family interaction engine may also include one or more versions of any of those containers, with some versions based on the family profile and other versions based on individual user profiles. The family interaction engine may also populate the family channel with different containers.

The family interaction engine may determine the types of containers to be used for the family channel, and the types of content to be included in each container, based at least in part on the family user profile. Any of the users may manually change the corresponding settings for the family channel in the family user profile. For instance, containers in the family channel may have controls for hiding and displaying each container, and individual users may use those controls to manually hide or display containers. The family interaction engine may also provide an "Add Container" user interface control that allows Individual users to add new containers to the family channel.

In addition, the family interaction engine may automatically adjust some settings for the family channel, based on actions within the family account and within the individual user accounts.

For example, the family interaction engine may automatically sense the presence of individual users (e.g., using voice identification or face recognition), and the family interaction engine may automatically show or hide containers, based on the preferences of those detected users. Also, any feedback provided by the users (e.g., selecting a "like" or "dislike" button, a "dismiss" button, etc.) may impact the future content of the family interaction engine.

Furthermore, the family interaction engine may change the appearance, format, and content of the family channel, based on whether (a) the family user is logged in or (b) an individual user is logged in, but the tablet is in an idle, inactive, or passive mode. For instance, when the family user is open, the family channel may use tiles or other containers to show content that entices the user to click on a link for more information, but when the tablet is idle, the family channel may remove one or more of those containers and may instead show summarized information followed by a detailed story, which may appear in a different section or be scrolled within a container. In other words, the family channel may show less content that is designed for active engagement and more content that is designed for passive consumption (e.g., like a television program or a news reader). A container designed for passive consumption may enable users to get the latest updates on important topics, without the need to actively engage or interact with the tablet. The family channel may shift to a preferred modality when the tablet is idle. For instance, the family channel may be configured to use audio feeds as the preferred method for providing information when the tablet is in ambient mode. Consequently, when the tablet transitions to ambient mode, the family channel may replace a widget that provides textual information with a widget that provides audible information.

The family interaction engine may make similar adaptions based on other attributes of the user (or users) near the tablet. For instance, a user profile may indicate that text feeds are the preferred method for providing information when the user is sitting in front of the tablet, video feeds are the preferred method when the user is standing near the tablet; and audio feeds are the preferred method when the user is moving around. If the family interaction engine detects that the user is sitting in front of the tablet, the family interaction engine may funnel content to the family channel via a widget that presents text. In one scenario, the user may be interested primarily in news, and the family interaction engine may present news headlines in the widget. If the family interaction engine detects that the user is standing near the tablet without changing location (e.g., while folding clothes), the family interaction engine may funnel content to the family channel via a widget that presents video. If the family interaction engine detects that the user is wandering around the house, the family interaction engine may funnel content to the family channel via a widget that plays audio. In each case, the family interaction engine may first tailor the content, and then, once the content is determined, the family interaction engine may determine the method for delivering the content, based on user preferences, user activity, and the person or people near the tablet. For instance, the family channel could automatically change from displaying a textual news story about a particularly event, to presenting a video news report on that same event, to presenting an audio report of that same event, as the user changes his or her activity.

Furthermore, if multiple people are near the tablet, the family interaction engine may use any suitable approach to automatically customize or blend the type of content to be delivered and the delivery mechanisms to suit those people and the activities those people are concurrently involved in.

As described in greater detail above and below, the family interaction engine may provide a variety of features which help to keep the family channel and the home screens for the individual user accounts from becoming disorganized and cluttered due to the choices, preferences and actions of other users. As common interests and relevant content are identified, these are presented appropriately via the appropriate containers in the family channel. So if multiple family users are interested in knowing results from the Olympics or knowing when people are expected to be home, the family interaction engine may bring such information to the surface through the family channel. However, if only one specific user is interested in the details of world cup soccer or the intimate details of his calendar, such information may be presented on the home screen of the individual user's account but not on the home screen for the other users' accounts, and not on the family channel. Thus, the family channel may facilitate an immediately useful and relevant interaction without any lag related to signing in to a specific account. And if a user desires a higher degree of individually tailored content, the user may sign in to his or her personal account.

For purposes of this disclosure, to "sign in" or "log in" to a user account generally means to provide user input that causes the tablet to open that account. For instance, if the tablet has just booted, the tablet may present a welcome screen containing selectable identifiers for each of the registered users. The current user may then select the identifier for the desired user account. If the selected account is not protected, the tablet may immediately open that account. If the selected account is protected, the tablet may prompt the current user for credentials (e.g., a userid, a password, biometric input such as a fingerprint or iris scan, and/or other input to show that the user is who he or she claims to be). If the current user supplies to proper credentials, the tablet may then open the selected account.

In some case, however, the tablet can provide for automatically signing in. For instance, in one scenario, the family account is not protected, all of the individual user accounts are protected, and the tablet is configured to automatically open or "sign in to" the family account upon bootup. In other scenarios, all, some, or none of the accounts may be protected or unprotected, and the tablet may automatically sign in to a protected individual user account in response to detecting that the corresponding user is utilizing the tablet, as described in greater detail below.

In one embodiment, the family interaction engine recognizes and automatically launches the correct profile, based on (a) the user or users in the room and (b) the known interest of that user or those users. For example, if Dad always uses the family profile and the tablet recognizes Dad's face, then the tablet may automatically startup to the family profile. In addition, the family interaction engine may customize the startup behavior based on learning over time or based on stated preferences of the users.

The family interaction engine may also tailor the content of the family channel in response to detecting people other than the registers users ("visitors") near the tablet. For instance, the family interaction engine may prevent the family channel from presenting personal family information if any people without individual user accounts are detected near the laptop.

Figure 4:
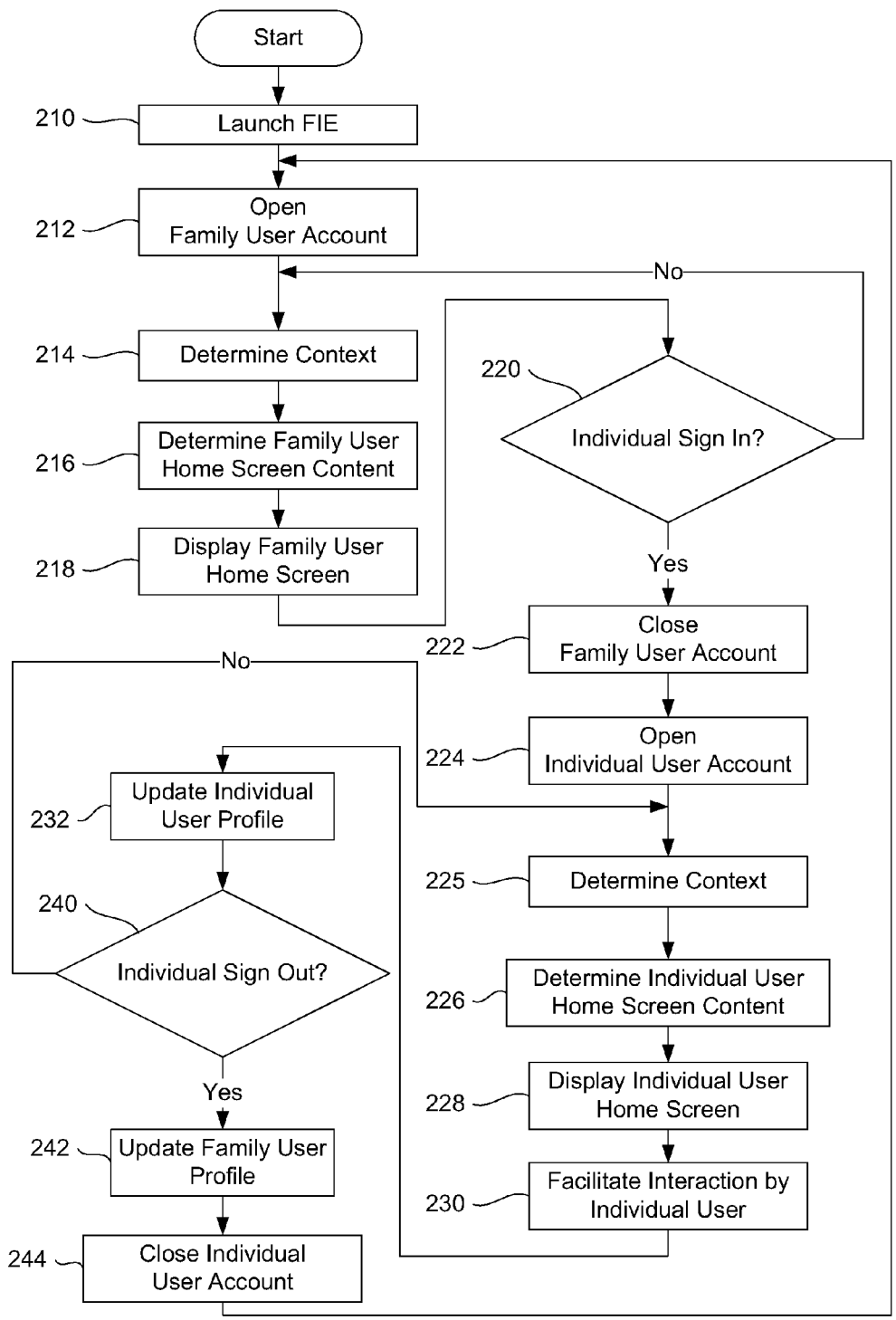
FIG. 4 presents a flowchart of a process for managing home screens on a data processing system according to an example embodiment.

FIG. 4 presents a flowchart of a process for automatically managing home screens in an example embodiment involving the tablet of FIG. 1. The illustrated process may start after the tablet has been booted to an OS. Then, as shown at block 210, the data processing system may automatically launch the family interaction engine (FIE). The family interaction engine may then open the family user account, as indicated at block 212. As depicted in block 214, the family interaction engine may then determine the current context for the tablet, as shown at block 214. Aspects of the current context that the family interaction engine may consider when determining what to include on the family channel may include the current time (including the current date) and the current location of the tablet. For instance, the family user profile and/or the individual user profiles may include data that identifies which users are likely to be using the tablet in family mode for a certain period of time during the day (e.g., mom at home with kids from 3:00 PM to 5:00 PM), and based on that data, the family interaction engine may automatically replace a container that shows financial news with a container that displays homework information from a school website during that time period. The current location may include many different aspects of location. For instance, the family interaction engine may determine general location attributes (e.g., whether the tablet is located at home, in the office, on the road, etc., as well as more specific location attributes (e.g., within the home, whether the tablet is located in the living room, the kitchen, the bedroom, etc.).

Other aspects of the current context that the family interaction engine may consider when determining what to include on the family channel may include, without limitation, scheduled events associated with one or more of the family members. For instance, the family interaction engine may recognize such events based on data from the family calendar, from individual user calendars, from events described in a social networking application, etc. Other aspects may include the activities that the current user is currently involved in (e.g., watching TV, listening to music, etc.), how noisy it is at the location of the laptop, whether any people are detected near the tablet, whether any registered users are detected near the tablet, what is playing on the television, the weather, unusual changes to routines associated with any of the family members (e.g., detecting that Dad is stuck in traffic when normally he would already be home), etc.

The family interaction engine may then determine which containers to display on the family user home screen, and which content items to include in those containers, as shown at block 216. These determinations may be based on the data in the family user profile, as well as on aspects of the current context for the tablet such as those mentioned above. Once the content is determined, the family interaction engine may display that content on the family user channel, for instance as one or more home screens, as shown at block 218.

As depicted in block 220, the tablet may then determine whether an individual user has signed in. If an individual user does not sign in, the process may return to block 214, with the family interaction engine determining the current context and adjusting the content to be included on the family channel in response to a significant change in context, as shown at blocks 214, 216, and 218.

If an individual user has signed in, the family interaction engine may close the family user account, as indicated at block 222, and open the individual user's account, as shown at block 224. The family interaction engine may then determine the current context and what content to show on the individual user's home screen, as depicted at blocks 225 and 226. The family interaction engine may display that content on the individual user's home screen, as indicated at block 228.

As shown at block 230, the family interaction engine may then facilitate interaction by the individual user, as described in greater detail below with regard to FIGS. 6-8. In addition, as the individual user interacts with the tablet, the family interaction engine may update the individual user's profile accordingly, as depicted at block 232. For example, if the individual user pulls up a first article about politics and a second article about travel, the family interaction engine may update the user profile to record that the user is interested in politics and travel. The updated user profile may then influence future content items and content recommendations for the individual user, as well as the content for the family user channel.

As shown at block 240, the family interaction engine then determines whether the individual user is signing out. If the individual user does not sign out, the process may return to block 225, with the family interaction engine determining the current context and determining the content to display on the individual user's home screen, etc., as indicated above. If the individual user signs out, however, the family interaction engine may update the family user profile based on the actions of the user in the individual user account, as indicated generally at block 242, and as described in greater detail below with regard to FIG. 5. The family interaction engine may then close the individual user account and open the family user account, as shown at blocks 244 and 212. The process may then repeat the operations described above, as appropriate.

Thus, the family interaction engine automatically learns family preferences and behaviors and self-configures to optimize use for the family as a whole. The family interaction engine may dynamically configure the family user profile and the family channel. The family user profile may serve as an anchor point on a multi-user, multi-profile family tablet. As described in greater detail below with respect to FIG. 5, the family user profile may allow the family interaction engine to identify recommended content and applications based on aggregating the preference models from all user profiles on the tablet.

Figure 5:
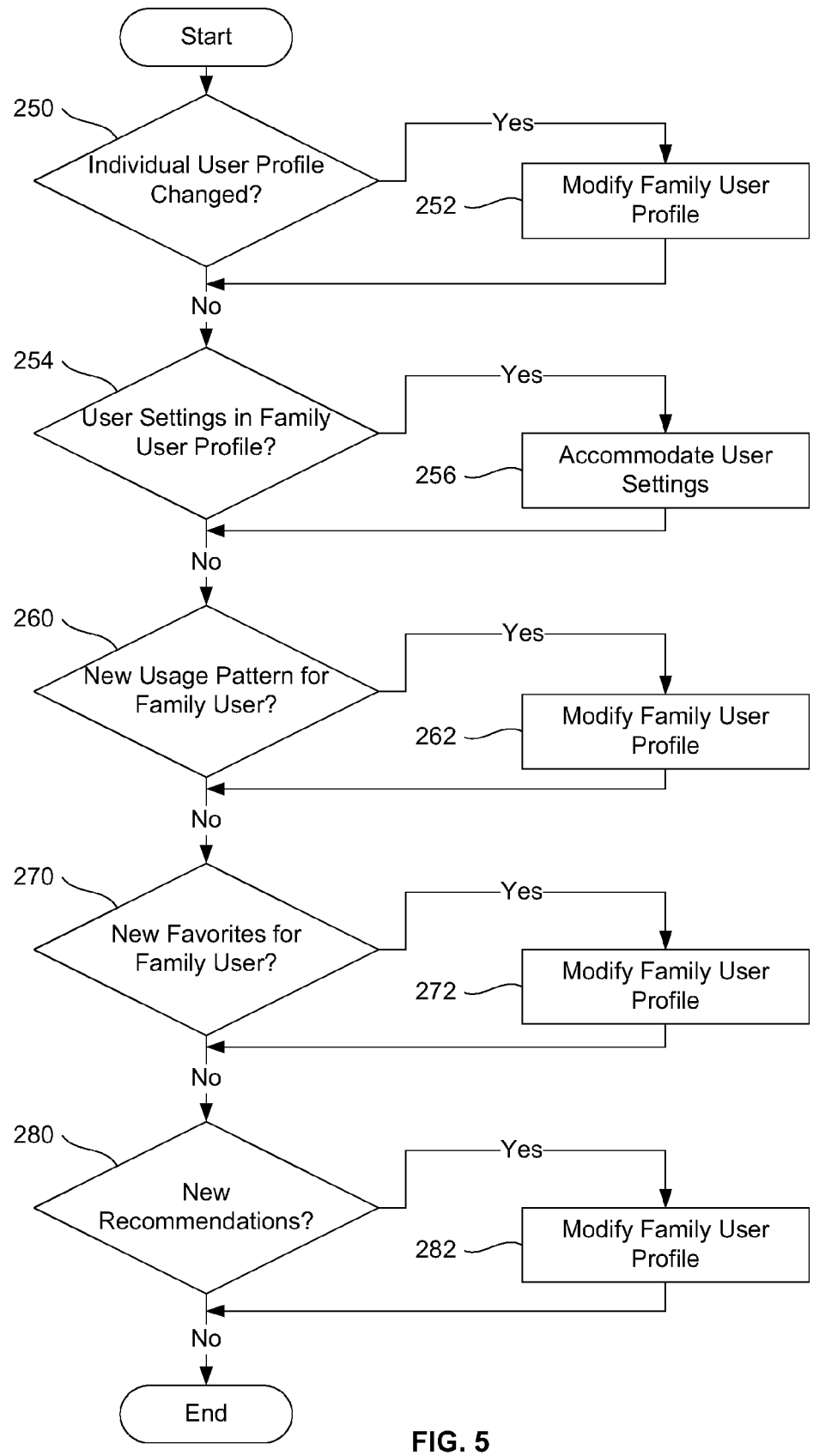
FIG. 5 presents a flowchart of an example embodiment of a process for managing a family user profile.

FIG. 5 presents a flowchart for an example embodiment of a process for modifying a family user profile. As mentioned above with regard to block 242 of FIG. 4, the family interaction engine may use the process for modifying the family user profile may in response to an individual user signing out of his or her individual user account. As shown at block 250 of FIG. 5, when a user logs out of an individual account, the family interaction engine may respond by determining whether the user profile for that user changed while the user was logged in. If the use profile was changed, the family interaction engine may modify the family user profile accordingly. For instance, the individual user's profile may include the individual user's settings; a preference model for the user; lists of favorite songs, websites, etc. for the user; and other types of data, including without limitation data reflecting various different interests of the user. The preference model may include manual settings specified by the user, as well as settings based on the user's responses to recommendations made by the content recommendation engine. In addition or alternatively, the family interaction engine may automatically update the individual user profile, in response to detecting a new usage pattern, based on user actions showing that a previous interest (e.g., in movies) has been superseded by a new interest (e.g., in music). If there were changes to the part of the user profile that identifies the preferences and interests of the user, or to other parts of the user profile, the family interaction engine may make the same or similar kinds of changes to the family user profile, as shown at block 252.

Block 254 shows the family interaction engine determining whether a user has specifically requested a change to the family user profile, for instance via a profile settings function made available by the family interaction engine when the family user account is open. If a user has requested a change to the family user profile, the family interaction engine may record that change to the family user profile, as shown at block 256.

Block 260 shows the family interaction engine determining whether a new usage pattern has been detected for the family user. If the family interaction engine has detected a new usage pattern for the family user, the family interaction engine may adjust the family user profile accordingly, as shown at block 262. For instance, if the family interaction engine determines, based on an analysis of user interactions with content items presented on the family channel, that the family user has a strong interest in national news items, and little or no interest in the local weather forecast, the family interaction engine may adjust the family user profile to cause the weather panel in the family channel to be replaced with a national news panel.

Block 270 shows the family interaction engine determining whether the family user has designated any items of content as a new favorite. If so, the family interaction engine may update the family user profile to identify the new favorite item or items, as shown at block 272.

Block 280 shows the family interaction engine determining whether the content recommendation module has presented any new content recommendations to the family user. If the content recommendation module has presented new content recommendations, the family interaction engine may modify the family user profile to include those recommendations, as indicated at block 282. The process of FIG. 5 may then end.

Figure 6:
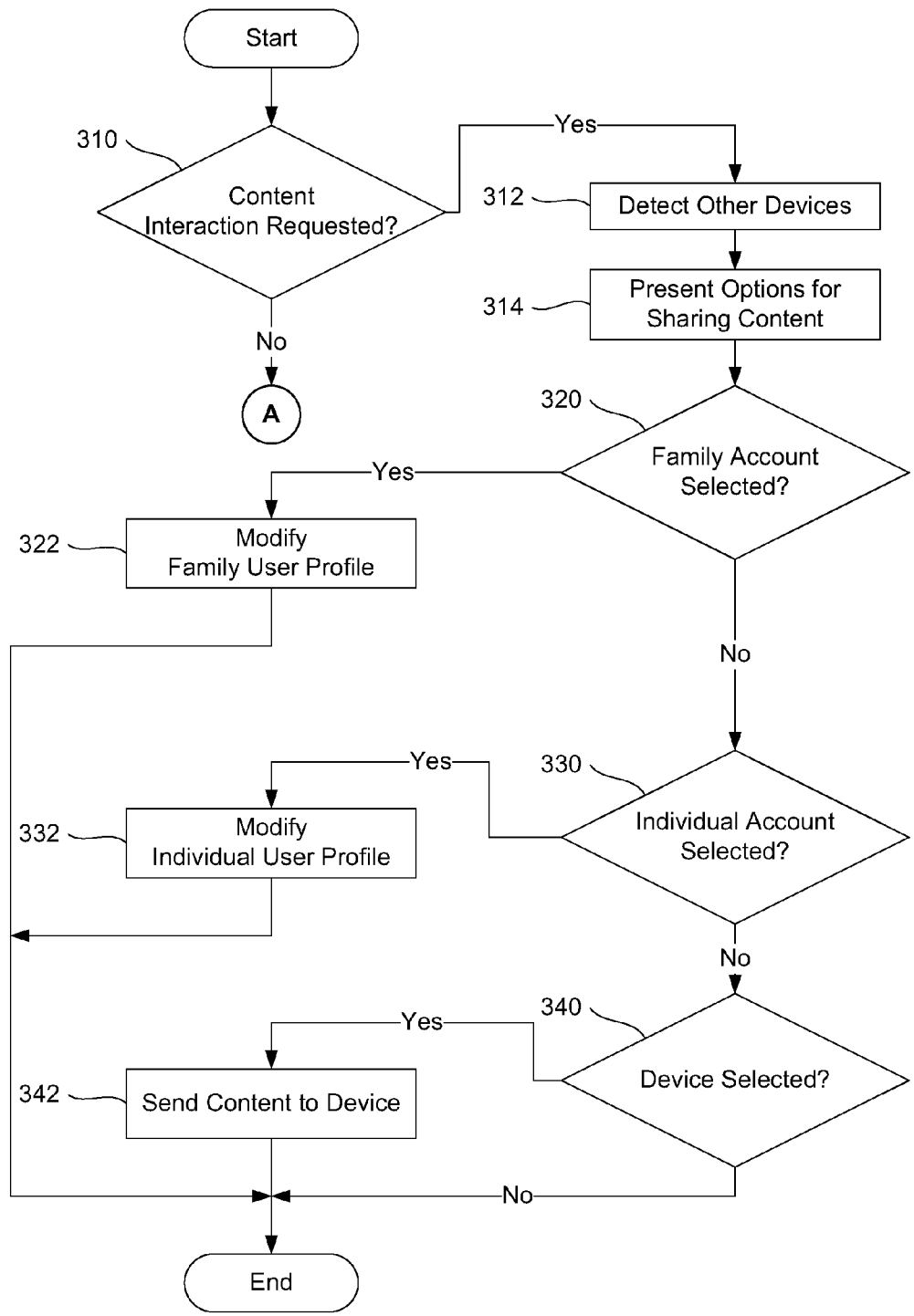
FIGS. 6-8 present a flowchart of an example embodiment of a process for facilitating user interactions with a data processing system.
Figure 7:
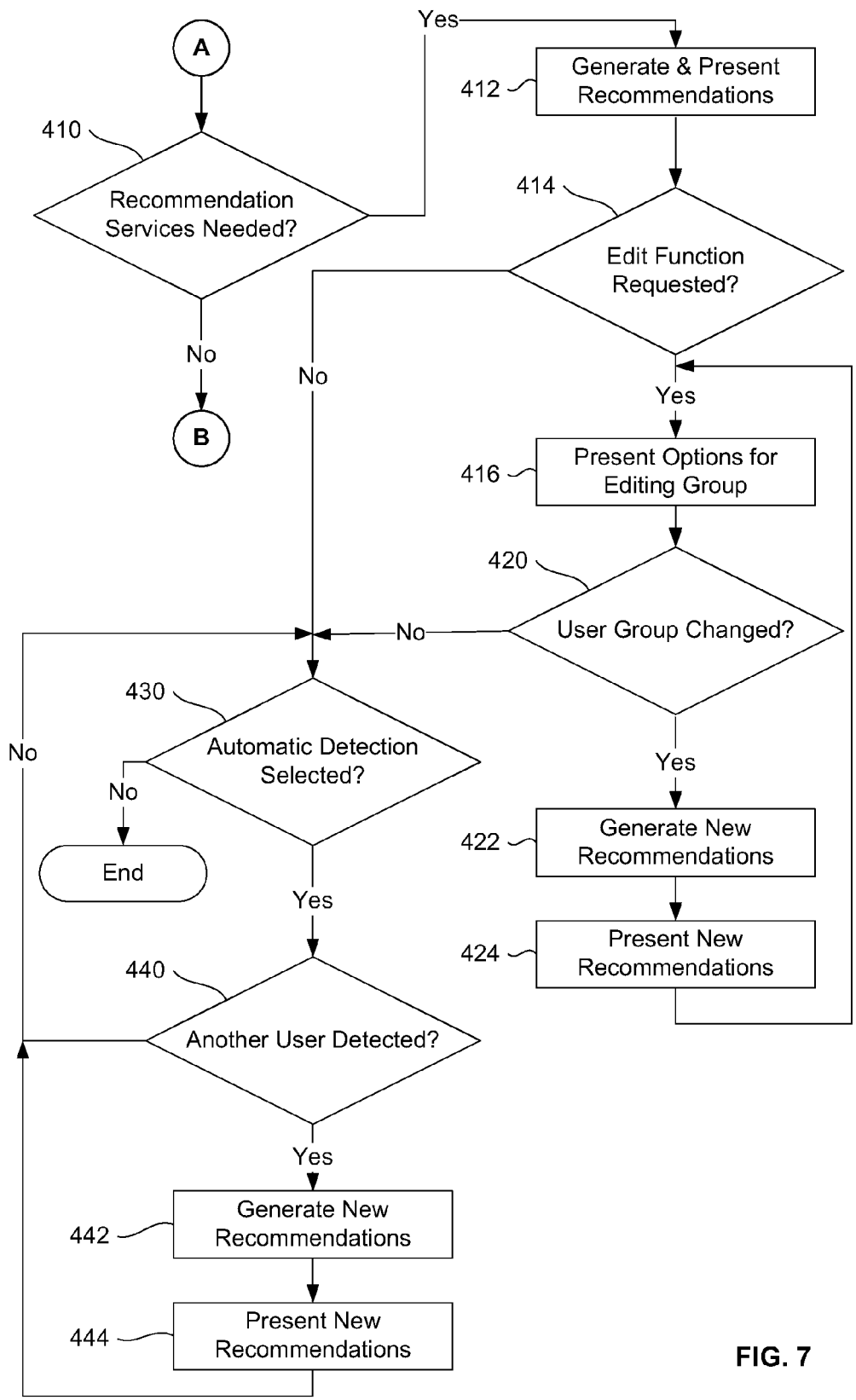
Figure 8:
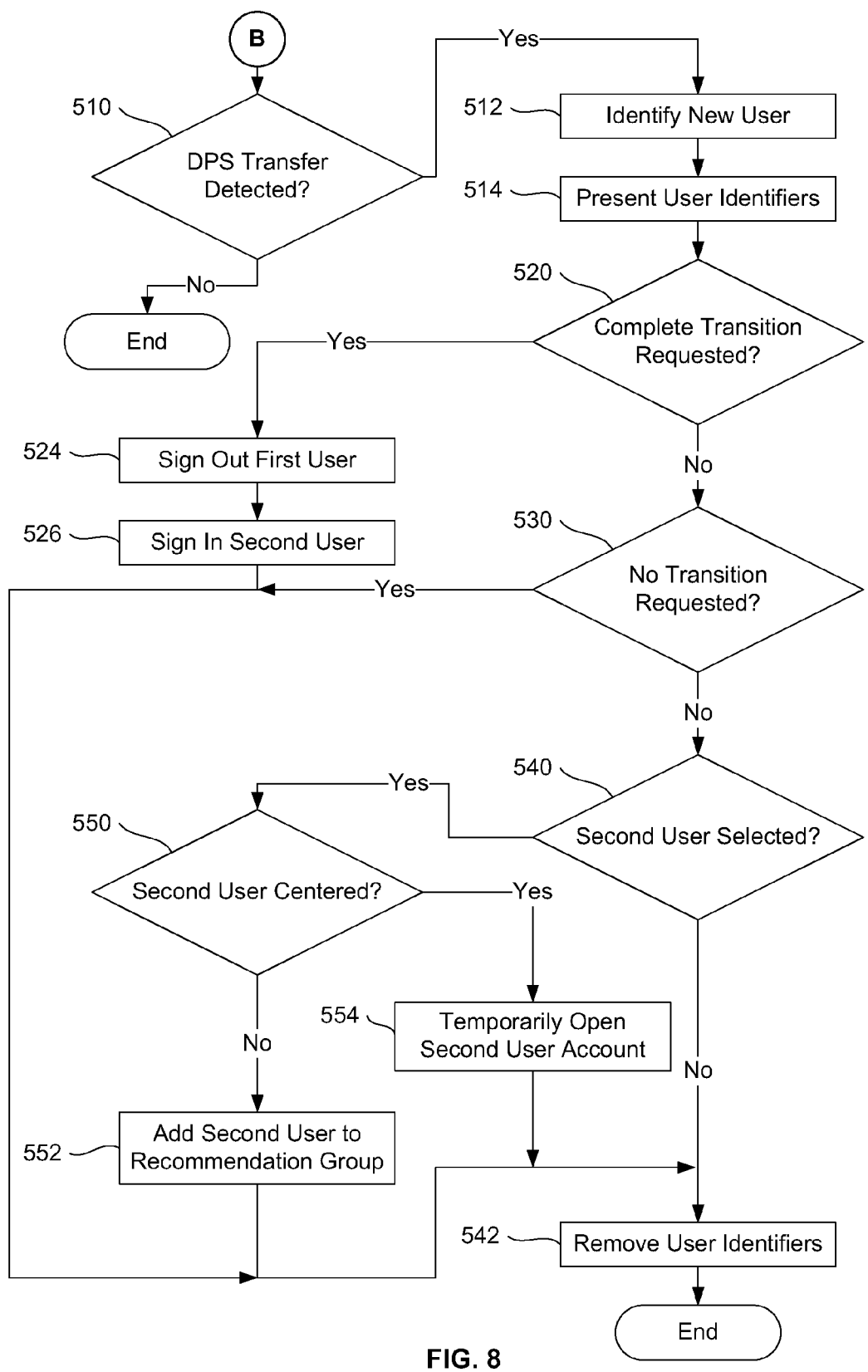

FIGS. 6 through 8 present a flowchart of an example embodiment of a process for facilitating user interaction using the tablet of FIG. 1. In particular, FIG. 6 illustrates operations associated with the content sharing module, FIG. 7 illustrates operations associated with the content recommendation module, and FIG. 8 illustrates operations associated with the tablet transfer module.

The process of FIG. 6 involves features which make it simple for users to leave messages and reminders for other users, and to share content with other users, including the family user. The process of FIG. 6 may begin with a user already signed into the tablet under either an individual user account or under the family user account. As shown at block 310, the family interaction engine may then determine whether the user has requested content interaction. In one embodiment, the user may request content interaction by clicking a piece of content on the home screen and dragging the content towards the top of the display.

If the family interaction engine determines that the user is requesting content interaction, the family interaction engine may launch the content sharing module. Alternatively, the tablet may automatically launch the content sharing module when the tablet boots up or whenever a user logs in to an account, and then the content sharing module may determine whether the user is requesting content interaction. As shown at block 312, after the content sharing module has been launched, and possibly in response to a request for content interaction, the content sharing module may automatically detect whether any other registered devices are located within a predetermined range of the tablet. The content sharing module may create or update a device list to identify the detected devices. In addition or alternatively, the family interaction engine may periodically monitor for registered devices within range of the tablet, and the family interaction engine may update the device list dynamically. The content sharing module may then use the device list to determine which devices should be presented as potential recipient devices.

As depicted at block 314, the content sharing module may then present the user with options for sharing content. For example, the family interaction engine may display identifiers for various potential recipients, such as a list of known users and a list of detected devices. For purposes of this disclosure, an identifier may be a textual name or other textual term; an image, icon, or other graphical representation; or any suitable combination of text and graphics. For instance, the content sharing module may present the detected devices as device names, as device and/or user images, or as a combination of device names and device/user images. The list of known users may include all of the registered family members. For instance, in one scenario, the list of known users may include the names or individual userids "Mom," "Dad," "Jack," and "Jill." The content sharing module may present identifiers for each of the known users. The list of detected devices may include all of the family devices detected in block 312 and/or listed in the device list.

The content sharing module may determine which users own which devices based on the user profiles. For instance, a specific device (or multiple specific devices) can be linked to a specific user account when that user account is created or modified on the tablet. In addition, multiple devices may run the family interaction engine, the same family members may be registered as users on those devices, and the resulting user profiles may also identify which users own which devices. The family interaction engines on those devices may interact together using any suitable approach.

In one embodiment, if the user drags a piece of content towards the top of the display, the content sharing module may cause a horizontal bar to pop up across the top of the display. That bar may be referred to as the sharing bar. The content sharing module may display, within the sharing bar, identifiers for each known user and each detected device.

Alternatively, the user can share content on the home screen by selecting a "Share" button and then specifying whom the content should be shared with. In addition, applications may provide input objects (or other mechanisms) which allow users to invoke sharing options of the content sharing module. For instance, a web browser application that displays content may also provide a menu option in the application's user interface for sharing selected content with other users on the tablet (or with the family account). When the user selects that sharing option, the content sharing module may present a sharing bar (or other interface for selecting recipients) as described above.

After presenting potential recipients to the user, the content sharing module may then determine whether the user has selected a recipient. For instance, as shown at block 320, the content sharing module may determine whether the user has selected the family account as the recipient. The user may select the family account as the recipient by dropping the content on an area of the screen associated with the family channel. For example, if the user drags content over the sharing bar and then hovers or lingers there for an extended period of time (e.g., one second), the content sharing module may create a larger window that shows the family channel (or the family channel may fill the screen). In other words, the content sharing module may cause the bar to extend to reveal the family home screen. The user may then drop the content onto the family home screen. Alternatively, to select a recipient, the user may simply click on the identifier for that recipient.

If the family user account has been selected, the content sharing module may modify the family user profile accordingly, as indicated at block 322. For instance, the content sharing module may modify the family user profile in a way that causes the family interaction engine to present the shared content on the family channel when the family channel is subsequently displayed (e.g., when the family account is open). The family interaction engine may display the shared content in a widget or other container on the home screen that is designed to present content that has been shared with the family account. Thus, by selecting the family account as the recipient, the user makes the content accessible for all family members to view in the tablet's ambient mode.

Thus, the content sharing module may provide a simple method for a user to instantly share content with others tablet users in a family. Users can share any type of content with the family account, including without limitation messages and calendar reminders. For instance, if Mom is traveling for work, she can record a funny video message for Jack and Jill on her smartphone and then share the video message from her smartphone to the family channel, for Jack and Jill to see when they get home from school. (Additional information about a family channel service that provides for this kind of sharing is provided below in connection with FIG. 9.) And if Jack needs a ride home from band practice on Monday, he can create a calendar reminder to that effect on the tablet under his individual user account, and then share that reminder to the family channel. Anyone viewing the family channel could then see that reminder. Likewise, Dad can share reminders about chores for the kids, etc.

However, referring again to block 320, if the family account is not selected, the content sharing module may then determine whether an individual user account has been selected, as depicted at block 330. The user may select a user account by dropping the content on the identifier associated with that account in the sharing bar or by selecting the content and then selecting the identifier for that account, for instance. When an individual user account has been selected, the content sharing module may modify the user profile for the selected account accordingly, as shown at block 332. For instance, the content sharing module may modify the user profile in a way that causes the family interaction engine to present the shared content on the home screen of the selected user when the selected user logs in. The family interaction engine may display the shared content in a container that is designed to present content that has been shared with the user, for example. In addition or alternatively, the family interaction engine may display the shared content on the family channel screen if the selected user is detected near the tablet, as described below. Like with the family channel, users may share any type of content with other individual users.

However, referring again to block 330, if the content sharing module determines that an individual user account has not been selected, the content sharing module may then determine whether a particular device has been selected, as indicated at block 340. The user may select a device by dropping the content on an identifier or image associated with that device. In one embodiment, the content sharing module initially presents only the list of family members, but then if the user drags the content to an individual user identifier and then hovers there for an extended period of time (e.g., one second), the content sharing module expands a drop down menu that lists the devices belonging to the selected user. The sharing user may then drop the content onto one of those listed devices. Alternatively, to select a device, the user may simply click on the identifier for that device.

In addition, after detecting other devices, the content sharing module may determine where those devices are located, relative to the tablet. Additional details concerning features for detecting the relative positions of mobile devices may be found below in Appendix A: Mobile Device Position Detection.

The content recommendation module may also enable the user to send content to another device that is near the tablet by simply flicking the content in the direction of the other device. The content sharing module may provide this functionality without expanding the content into an application and without displaying the sharing bar. If an icon or other identifier for a particular content item is displayed on the home screen, the user may simply flick that icon towards the target device. The content sharing module may then automatically determine whether the user has flicked the identifier for the selected piece of content towards one of the other devices. In response to determining that the user has flicked the content towards one of the other devices, the content sharing module may automatically send the selected piece of content to that device. In addition, the tablet and the other devices may be configurable, with regard to how received content is to be presented. For instance, the user of a device may save a configuration setting that selects among multiple content display options for the device. The content display options may include without limitation a first option to configure the device to automatically display received content and a second option to configure the device to automatically display a notification that content has been received.

Referring again to block 340, if a device has been selected, the content sharing module may instantly send the shared content to that device, as depicted at block 342. Users may share any type of content with devices. The content sharing module may then remove the sharing bar, and the process may then end. Alternatively, the content sharing module may keep the sharing bar displayed, the process may return to block 320, and the user may share the content with additional users and devices.

As indicated above, the content sharing module may also enable users to share content from within an application, while logged in to an individual user account or while logged in to the family user account. For instance, the home screen may include a video player application. When the user selects a specific piece of content (e.g., a specific video file), the video player application may expand to display the content, along with an option (e.g., a menu button labeled "Share" or any other suitable input object or mechanism) for the user to activate sharing functionality. Consequently, while the user is using the video player application to watch the video on the tablet, he or she may select the share option. When the user selects the share option, the content sharing module may bring up the sharing bar, and the user may select another user or device as the recipient, as described above. The content sharing module may then update the user profile for the selected recipient user and/or transmit the content to the selected device, as described above. The same kinds of options and operations may be provided by other types of applications. For instance, if the user is viewing a picture in a social networking application, the social networking application may provide a sharing option, and the content sharing module may bring up the sharing bar in response to user selection of that sharing option.

In one embodiment, to provide for sharing from within an application, the application provides one or more APIs or hooks that are exposed to the content sharing module. Such hooks may be published to provide for data exchange and personalization. The content sharing module may provide some or all of the user interface features that facilitate the sharing between devices and people. The content sharing module may also provide the mechanisms for transferring the data between users and/or between devices. Once content has been transferred, the content sharing module may then hand off the shared content to the application through the API, and the application may be responsible for presenting that content. Such an API may include fields to identify the user to receive the content, to identify the device to receive the content, to identify or include the content being shared, etc. The data field for the content may be application dependent, and the application may send whatever it needs to be able to retrieve on the other side. In one scenario, the family channel home screen is an application that uses the same kind of API to transfer content more or less like any other application. In addition, applications may use predefined data types to facilitate sharing between different applications. For example, one type of web browser on the tablet could share a hyperlink with a smartphone that uses a different type of web browser, and the shared link may easily be used by the web browser on the smartphone because the data type is comprehended by both browser-type applications.

In addition, the home screen of any device or user account to which content has been shared may be automatically updated and dynamically refreshed to show any new content that has been shared with that device or account user.

The address book may also allow each user to flag individuals and groups that are listed in the address book ("contacts") for inclusion in the sharing bar. Subsequently, whenever a user brings up the sharing bar, the content sharing module may also display identifiers for each of those flagged contacts as potential recipients. Alternatively, the content sharing module may include a configuration setting that allows the user to specify that all of the contacts in the user's address book are to be shown in the sharing bar.

The content sharing module may thus make it easy for users to share content. By contrast, with a conventional tablet, a user might need to execute numerous inconvenient actions in order to share content. Conventional techniques for sharing content include embedding the content within or attaching it to an email message; transferring the content via a flash drive; and copying the content to a file server or to a website that provides similar services.

However, referring back to block 310, if content interaction has not been requested, the process may pass through page connector A to FIG. 7.

People use tablets and other data processing systems extensively for content and media consumption, including reading online news, browsing content from the World Wide Web, watching online television (TV) and movies, etc. Recommendation systems help people to find content that may interest them. A conventional recommendation system may focus on serving individual users (e.g., as part of an application or service that provides videos on demand). Accordingly, the recommendation system may generate recommendations for a particular user or account based on the preferences specified by the individual owner of that account.

However, a tablet (or other data processing system) may be shared by multiple members of the same group, such as a household or family, and the family may use that tablet in a social setting (e.g., with the whole family together in the same room for family night). When a recommendation system based on single users is used in a group setting, the system may be incapable of generating and providing suggestions that are relevant or well suited to the entire group. Instead, the recommendations may be well suited only to the specific individual who is logged in to the tablet.

FIG. 7 shows an example process to enable a tablet to generate and provide recommendations that are well suited to an entire group of individuals. A content recommendation module executing on the tablet may perform some or all of this process. For instance, the tablet may launch the content recommendation module automatically for each user whenever that user logs in. The family interaction engine may use the content recommendation module when determining content for the family channel and when determining content for each individual user's home screen. As indicated above with regard to the recommended content panel, the home screen may include a container for presenting content recommendations, based on the user profile for the current user. In particular, the content recommendation module may present recommendations based on a preference model for the current user. The preference models for the users may be stored in the respective user profiles, or in any other suitable location. Alternatively, the family interaction engine may launch the content recommendation module in response to a determination that recommendation services are needed. For instance, the family interaction engine may determine that recommendation services are needed in response to the current user selecting an option to launch the content recommendation module. Alternatively, the family interaction engine may determine that recommendation services are needed in response to the user launching a different application that provides recommendation services, such as a music player, a video player, a media program guide, a content provision service, etc.

FIG. 7 may begin with the content recommendation module determining whether recommendation services are currently needed, as shown in block 410. Alternatively, the family interaction engine may determine whether recommendation services are needed, and launch the content recommendation module as necessary. The content recommendation module may then generate and present recommendations for the current user, as described above and shown at block 412. The content recommendation module may then determine whether the user has selected a feature or option for editing the members of the group for whom recommendations are to be generated (the "recommendation group" or "user group"), as shown at block 414. By default, the recommendation group may include only the current user. In response to the user selecting an option to edit the recommendation group, the content recommendation module may provide simple and intuitive features that allow the user to dynamically add users to and remove users from the recommendation group at any time.

As shown at block 414, if a function for editing the recommendation group has been selected, the content recommendation module may present options for changing the recommendation group. For example, the content recommendation module may display a list of all known tablet users, including the family user, for potential inclusion in the recommendation group. The content recommendation module may present users as names, userids, images (e.g., thumbnails), or any suitable combination these or other identifiers. Then, if one or more family members are also interested in the content recommendations, the current user may select those users by touching, clicking, or otherwise selecting their identifiers in the displayed list. In response to a user being selected, the content recommendation module may add the selected user to the recommendation group.

For instance, Dad may initially be using the tablet by himself, logged in to his own account, and the home screen may automatically present recommendations based only on Dad's preferences. Jill may then sit down next to Dad, and Dad may use the edit function to add Jill to the recommendation group. Consequently, the home screen may automatically present recommendations based on the preferences of Dad and Jill, combined.

Similarly, users can be deleted from the recommendation group either manually or automatically, in response to detecting that the particular user is no longer present in front of or next to the tablet, for instance. Manual options for deleting a user from the recommendation group may include a "Remove" button associated with that user in the user interface. The person holding the laptop may also remove a user by dragging or swiping that user's thumbnail out of the recommendation group in the user interface.

The content recommendation module may then determine whether the recommendation group has been changed, as indicated at block 420. If the recommendation group has changed, the content recommendation module may generate and present new content recommendations, based at least in part on the profiles of the users in the recommendation group, as shown at blocks 422 and 424. For example, the content recommendation module may determine that a particular G-rated movie is of potential interest to all of the identified users, and the content recommendation module may update a container in the family channel to recommend that movie. The process may then return to block 416, and the user may make additional changes to the recommendation group, as described above.

In addition or alternatively, the content recommendation module may cooperate with another local or remote application to produce content recommendations for a group of users and to provide for editing that recommendation group. For example, the content recommendation module may send, to an application that supplies movies on demand, data to identify the users in the recommendation group, or to identify the preferences of those users. The movies-on-demand application may then use that data to determine content recommendations, and the movies-on-demand application may then send those recommendations to the content recommendation module. The content recommendation module may then present the recommendations from the movies-on-demand application on the tablet. Alternatively, the movies-on-demand application may use the techniques described above to provide the options for editing the recommendation group.

However, referring again to block 420, if the current user has not manually changed the recommendation group (but has instead canceled the options for manually changing the recommendation group, for instance), the process may pass to block 430, and the content recommendation module may then determine whether the current user (or a previous user) has selected or turned on automatic detection. Alternatively, the content recommendation module may turn on automatic detection by default. If automatic detection is not turned on, the content recommendation module may terminate and pass control back to the family interaction engine, and the process of FIG. 7 may end.

If automatic detection is turned on, the content recommendation module may automatically determine whether any users other than the current user are present, as indicated at block 440. For example, the content recommendation module may utilize sensing technology (including without limitation speaker identification based on audio received by the microphone and/or face recognition based on video received by the camera) to automatically identify users near the data processing system. If the content recommendation module detects another user, the content recommendation module may automatically add the detected user to the recommendation group and then generate and present new recommended content, based at least in part on the profiles of the users that have been detected, as shown at blocks 442 and 444. In addition, the content recommendation module may display thumbnails or other identifiers for the known users, and when a user is detected, the content recommendation module may highlight that thumbnail for that user. If the content recommendation module does not detect another user, the process may continue to loop through blocks 440 and 430 until another user is detected, automatic detection is turned off, or the content recommendation module is terminated. Alternatively, the process may return to block 414, with the content recommendation module providing options for manually editing the recommendation group, as indicated above.

As has been described, the content recommendation module allows the current user to easily change the recommendation group. A family that is using the tablet together may use the functions of the content recommendation module to find content they are all interested in. The content recommendation module may enable users to easily control the process by which the tablet recommends content for multiple people. The simple and intuitive user interface (UI) of the content recommendation module may greatly increase the likelihood that group recommendation functionality will be utilized.

However, referring again to block 410, if recommendation services are not needed, the process may pass through page connector B to FIG. 8.

FIG. 8 pertains to a tablet transfer module that automatically determines whether the tablet has been handed off or transferred from one user to another, and that, in response to a hand off, provides a convenient interface for changing which user account is open. As described in greater detail below, the application tailoring module may use gesture identification and automatic user identification to enable a first user to share the tablet with a second user while maintaining control over the personalized experience for the first and second users.

The process of FIG. 8 may begin with the tablet transfer module or the family interaction engine automatically determining whether the tablet has been handed off or transferred from one user to another, as shown in block 510. The act of handing off the tablet may be considered a handoff gesture. The tablet may determine that it has been transferred to a new user in response to a combination of events detected by various components of the tablet, such as the motion/orientation sensors and the touch screen display. For instance, the tablet may detect that, after a period of interaction by logged in user A, touch interaction is no longer detected by the capacitive sensor, or the touch information is static (e.g., the user is holding the device as commonly happens in connection with a handoff); then a movement captured by the accelerometer is detected, and another touch "static" interaction is detected (e.g., the new user takes the tablet in his or her hand). Or a handoff could be simply detected by identifying a different user looking at the camera. And the facial recognition feature may be further optimized by only triggering camera capture when some activity is detected from the accelerometer. However, an actual handoff need not be detected accurately by the accelerometer when handoff detection is augmented with facial recognition. However, if the family interaction engine detects that the tablet has not been actively used for a predetermined amount of time before the tablet is grabbed by the second user, the family interaction engine may determine that no transfer has been detected, and the family interaction engine may automatically transition to family mode.

Also, if no transfer has been detected, the process of FIG. 8 may end. But if a transfer has been detected, the family interaction engine may launch the tablet transfer module, and the tablet transfer module may automatically determine the identity of the new user, as depicted at block 512. Alternatively, the tablet may automatically launch the tablet transfer module whenever the tablet boots up or whenever a user logs in, and the tablet transfer module may determine whether determine whether a transfer has transpired. The tablet transfer module may use sensing technologies like those described above with regard to the content recommendation module (e.g., face and/or voice recognition) to identify the new user. For purposes of FIG. 8, the user who was originally holding the tablet is referred to as the first user, and the user to whom the tablet has been handed is referred to as the second user. As described in greater detail below, the tablet transfer module may then determine what type of user account changes should be applied, if any, based on user input received after the tablet has been transferred. For instance, as described below, the tablet transfer module may provide for a complete transfer or transition, a temporary transition, a shared transition, and no transition.

In one embodiment, in response to detecting a physical transfer of the tablet, the tablet transfer module may automatically present an identifier for the first user and an identifier for the second user on the display of the tablet, as indicated at block 514. The user identifiers may be in the form of thumbnail images, userids, names, or any other suitable identifier. As shown at block 520, the tablet transfer module may then determine whether user input has been received to request a complete transition, according to which the first user is to be removed or signed out and replaced with a new current user. A complete transition may be requested if the first user is finished with the tablet and does not plan to use it again soon, for instance. The input for a complete transition may constitute a swipe gesture in which the first user's thumbnail image (or other identifier) is dragged or swiped off the screen, to indicate that the first user should be removed.

As depicted at blocks 524 and 526, if it is determined that a complete transition has been requested, the tablet transfer module may automatically sign out the first user and automatically sign in the second user, or prompt the second user to sign in. To automatically sign the second user in, the tablet transfer module may use face recognition with the tablet camera to automatically authenticate the second user. This automatic sign in process may be more or less invisible to the users. In addition, if the face recognition fails, the tablet may automatically fall back to the family mode for privacy reasons (e.g., to ensure the safety of the data of the user who just handed off the device).

Once the second user is signed in (or once the family account is opened), the process may then pass to block 542, which illustrates the tablet transfer module removing the remaining thumbnail (in this case, for the second user) from the screen. The process of FIG. 8 may then end, with the second user (or the family user) signed in and using the tablet as desired.

However, referring again to block 520, if a complete transition was not requested, the tablet transfer module may then determine whether a request has been received for no transition (i.e., to leave the first user signed in), as indicated at block 530. No transition may be requested if the first user is not finished with the tablet and expects the second user to return the tablet soon, for instance. The user input to request no transition may constitute a swipe gesture in which the second user's thumbnail image is swiped off the screen. If the tablet transfer module receives input requesting no transition, the process may pass from block 530 to block 542, and the tablet transfer module may remove the remaining thumbnail (in this case, for the first user) from the screen. The process of FIG. 8 may then end, with the second user holding the tablet but the first user still signed in.

However, referring again to block 530, if the option for no transition was not requested, the tablet transfer module may then determine whether a request has been received for a shared transition (i.e., for a transition to a session that takes into account the user profiles for both users). A shared transition may be desired if the first user and the second user plan to use the tablet to obtain recommendations for content predicted to be of interest to both the first and second user, so the first and second users might enjoy that content together, for instance. In one embodiment, as shown at blocks 540 and 550, the tablet transfer module may determine that a shared transition has been requested if one of the users has selected or touched the thumbnail for the second user without dragging that thumbnail to the center of the screen. In response to such input, the tablet transfer module may create a recommendation group that includes both the first and second users, as shown at block 552. The content recommendation module may then make recommendations based on the profiles of both users, as described above with regard to FIG. 7. The tablet transfer module may then remove the thumbnails or identifiers from the screen, as shown at block 542. The process of FIG. 8 may then end, with the second user holding the tablet and the shared account signed in.

However, referring again to block 550, if the thumbnail for the second user was centered, the tablet transfer module may implement a temporary transition in which the second user's account is temporarily opened, as shown at block 554. A temporary transition may be desired when the first user intends to grant temporary access to the second user, to allow the second user to share content with, or send content to, the first user, for example. The user identifiers may then be removed from the screen, as indicated at block 542, and the process of FIG. 8 may then end. However, when the second user hands the tablet back to the first user, the tablet transfer module may automatically close or log out the second user, and then re-open or log in the first user.

In another scenario, the first user hands the tablet to a second user who intends to use the same application, but with the contextual customization of the application dependent on the person holding the tablet. For instance, Mom and Dad may be sitting together on the couch watching the Olympics, and Dad may open an ACME Olympics Application that works collaboratively with what is showing on a television channel. While Dad holds the tablet he receives statistical information about the competitors (e.g., what are the world record times, who is expected to win, what are the competitors best times, etc.). When Dad hands the tablet to Mom, the ACME Olympics Application continues to run, but it changes the nature of what is being presented. For instance, for Mom it presents a list of interesting facts about the venue (e.g., when it was built, what other events it has been used for, which celebrities are currently at this forum, which company supplies the uniforms, what are the uniforms made from, a link to purchase similar product, etc.). In this case, the first user was not logged out, and the running app continued to run, but the customization within the application was based on the user who held the tablet.

However, referring again to block 540, if the thumbnail for the second user is not selected within a predetermined, configurable period of time, the tablet transfer module may remove the user identifiers from the screen, as indicated at block 542, and the tablet transfer module may apply a default transition mode. In the embodiment of FIG. 8, the default transition mode is no transition. The process of FIG. 8 may then end.

Figure 9:
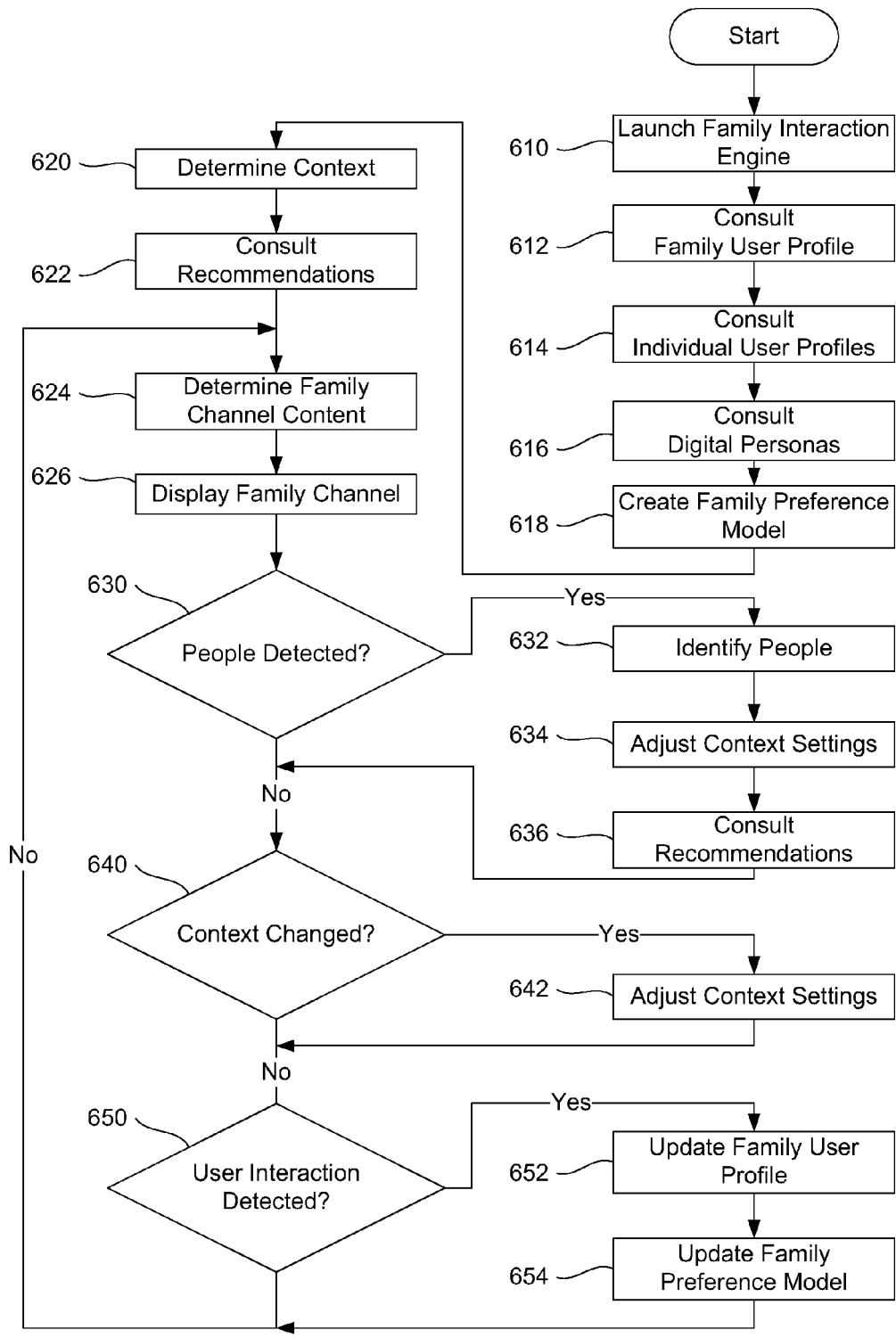
FIG. 9 is a flowchart of an example embodiment of a process for automatically determining content to be presented.

FIG. 9 presents a flowchart of an example embodiment of a process for automatically determining content to be presented in a family channel. As described in greater detail below, in that process, the family interaction engine may dynamically modify the contents of the family channel (e.g., which containers and which content items are displayed on the family channel), in response to many different factors, including without limitation predefined favorites and other preferences and settings (e.g., calendar entries) for the family user account; predefined favorites and other preferences and settings for individual user accounts; computer learning results for the family user account and the individual user accounts, based on previous interactions under the family user account and under the individual user accounts; and attributes of the current context, such as the current time and date, the application currently in use, which known users (if any) are near the tablet, etc. For purposes of this disclosure, the data about preferences and behaviors that the family interaction engine uses to determine family channel content may be referred to as the preference and usage data. Similarly, the data about the current context that the family interaction engine uses to determine family channel content may be referred to as context data. For instance, as indicated below, the family interaction engine may use the preference and usage data and the context data to dynamically generate and/or update a family preference model, and the family interaction engine may use the family preference model to determine family channel content.

Thus, the family preference model constitutes an aggregate of characteristics and preferences for the family user profile, along with results from analyzing preferences, preference models, and behaviors across all individual user profiles. The family interaction engine may observe, learn, and adjust the family preference model over time, based on an ongoing analysis of behavior, including usage of one or more content recommendation systems.

By analyzing factors such as those referenced above, the family interaction engine may automatically identify information and applications that are likely to be of interest to the family members. Consequently, the family interaction engine may automatically populate the family channel with different information and different applications in different contexts, so that the information and applications presented at any particular time or in any particular situation are more likely to be of interest to the family members at that time or in that situation.

The process of FIG. 9 may be performed by the tablet of FIG. 1, and that process may begin, for example, when the tablet launches the family interaction engine, as shown at block 610. As shown at block 612, the family interaction engine may then consult the family user profile to obtain preference and usage data that may help the family interaction engine to determine which types of content and which specific content items might be most suitable for presentation on the family channel. For instance, the preference and usage data from the family user profile may identify favored or commonly used content sources, favored or commonly used applications, favored or commonly used content categories or genres, favored or commonly used content items, and so forth. As shown at block 614, the family interaction engine may also consult the individual user profiles to obtain any or all of the same kinds of preference and usage data for each of the individual users. As indicated at block 616, the family interaction engine may also obtain preference and usage data by consulting one or more digital personas, which may be created and/or maintained by one or more local or remote digital persona services. A digital persona is a digital representation of important attributes and characteristics of a person. This digital representation may include data that has been volunteered, observed, and inferred about a person. Volunteered information includes information such as preferences, favorites, likes, factual information (credit card numbers, address, product preferences, etc.), and any other explicit information which a user has specifically shared. Observed information includes context-based information about a person that has been electronically sensed, observed, or captured (e.g., biometric data, sensed geo-location, purchase behavior, etc.). Inferred information is the result of analytics applied to volunteered and observed data. Inferred information can also be derived by analyzing and/or combining demographic information (e.g., where someone lives, income levels, etc.) and/or other types of information from one or more third-party data sources.

The digital persona service(s) may provide data defining digital personas for any or all of the registered users.

In one embodiment, the types of information that the family interaction engine extracts from the profiles and/or the digital personas include without limitation favorite item data (e.g., data that identifies specific websites, songs, videos, or other content items as having been selected by an individual user or the family user as favored);

favorite genre or category data (e.g., data that identifies different genres or categories of websites, songs, videos, news topics, or other content classes as having been selected by an individual user or the family user as favored);

favorite application data (e.g., data that identifies specific applications as having been selected by an individual user or the family user as favored); and other types of favored items, such as a favorite sports team. The extracted data may also include preferred item data, preferred category data, preferred application data, and other types of data identifying preferences that have been automatically detected by the family interaction engine, based on usage patterns of individual users and usage patterns under the family user account.

As shown at block 618, the family interaction engine may then aggregate and analyze the data about preferences and behaviors from the collective family user profile, the individual user profiles, and the digital personas to create the family preference model.

For purposes of this disclosure, when reference is made to a user profile, it should be understood that a digital persona, a context framework, and other similar types of data stores may be used instead of the user profile, or in addition to the user profile, unless clearly indicated to the contrary, either by the context or explicitly.

In one embodiment, the family preference model includes data that specifies or identifies observed preferences, observed behaviors, and expressed interests of each individual user, as well as data that specifies or identifies observed preferences, observed behaviors, and expressed interests for the collective family user account.

As depicted at block 620, the family interaction engine may also determine the current context for the tablet. For example, the family interaction engine may determine the time of day, the location, and the type of activity, if any, that one or more users may be using the tablet for. As described herein, another context attribute that the family interaction engine may detect is the identity of any family members currently in proximity to the tablet. Additional context attributes are described herein. The family interaction engine may save the information about the current context, and that information may be referred to as context data.

As indicated at block 622, the family interaction engine may also consult the recommendations generated by the content recommendation module. For instance, the family interaction engine may notify the content recommendation module as to the identity of any user in the vicinity of the tablet, and may request content recommendations tailored to that user or group of users.

The family interaction engine may then determine the types of containers, the types of content, and the specific content items to be presented on the family channel, based on the various different data sources referenced above, as shown at block 624. And the family interaction engine may display that content on the family channel, as indicated at block 626.

In one embodiment, the family interaction engine determines the content to be displayed on the family channel by assigning different weighting factors to different individual user profiles, based on which users are present. For instance, the family interaction engine may create or update the family preference model to favor content for the present users, based on the different weighting factors. For example, if Dad and Jill are interested in sports or particular sports teams, and Jack is not interested in sports, the family preference model may cause the family channel to display more sports-related containers and/or content when only Dad and Jill are present than when only Dad and Jack are present. And, as indicated below, the family interaction engine may determine content to be displayed based on which specific group of users is present.

As depicted at block 630, the family interaction engine may then determine (or re-determine) whether any people can be detected in close proximity to the tablet. If any people are detected, the family interaction engine may automatically determine whether those people are registered users, as indicated at block 632. The family interaction engine may use any suitable sensing technologies (e.g., face and/or voice recognition) to detect and identify people. As indicated above, the family interaction engine may also determine whether any previously detected users are no longer present. The family interaction engine may then adjust the context data to identify the present user or users, as shown at block 634. Thus, the group present becomes a context element.

In addition, the family interaction engine may update the individual user profiles and/or the family user profile to identify behaviors and interests associated with different groups within the family. The content recommendation module may also record and use this kind of information. For example, if Dad and Jill typically watch certain shows together or do certain activities together, then the family interaction engine and the content recommendation module may automatically prioritize those shows or activities in response to detecting that Dad and Jill are present. However, when Jack is also present, the group may tend to watch a different show. Accordingly, the family interaction engine and the content recommendation module may prioritize that show in response to detecting that Dad, Jill, and Jack are present. Thus, the family interaction engine may observe the family behavior and subsequently use those observations to provide an experience that is customized for different groups within the family.

Once the context has been adjusted according to the current circumstances, the tablet may then consult the content recommendation module to get content recommendations for the current user or group of users, as depicted at block 636.

Once the new content recommendations have been received, or if no people were detected at block 630, the family interaction engine may then determine whether the context has changed, as indicated at block 640. If the context has changed, the family interaction engine may adjust or update the context data, as shown at block 642.

In addition, if a user interacts with the tablet, those interactions may affect the content of the family channel. For instance, if a user under the family account loads a new picture onto the tablet, the family interaction engine may decide to add that picture to the family channel. Accordingly, after the family interaction engine updates the context data or determines that the context has not changed, the family interaction engine may detect whether a user is interacting with the tablet, as depicted at block 650. If a user is interacting with the tablet, the family interaction engine may update the family user profile and the family preference model, as indicated at blocks 652 and 654 (e.g., to identify the new picture as a favored or preferred item).

The process may then return to block 624, with the family interaction engine re-determining family channel content. The process of FIG. 9 may continue operating, with the family interaction engine dynamically updating the family channel in response to changing conditions.

Thus, the family interaction engine may dynamically modify the content of the family channel to provide content predicted to be most compelling to the family as a whole. In one embodiment, the family channel is a fluid UI of onscreen containers or container areas. Each container may run a different application, widget, newsfeed, or other service, depending on the context, the preferences of the users in the room, and the user interests. The shape and form of the UI may change in interesting ways, augmenting or removing containers, depending on the preferences of the users.

The contents of the containers may be selected to (a) match known preferences and favorites for a single user (e.g., a stock ticker for particular favored or preferred stocks, a particular favored or preferred media object or genre, a particular favored or preferred newsfeed), and/or (b) to have broader, group-based appeal (e.g., items from a family calendar, favored or preferred family media items or genres, location/status updates of other family members from social networking applications, health updates for extended family/friends via sites such as the one at www[dot]CaringBridge[dot]org, updates from a school website, updates from teachers, notes from one family member to the rest of the family, favored or preferred entertainment applications (e.g., an application for playing movies on demand), etc.

The family interaction engine may determine what content to display on the family channel based on a combination of both individual and aggregate family-favored content sources, applications, content items, and other information. The family interaction engine may use multiple data sources to determine the type of information that would interest the family. Data sources may include, without limitation, the family user profile; individual user profiles; user/family specified favorites; preferences based on observed behavior while using the tablet; and an integration of individual user favorites, preferences, and interests retrieved from a digital persona service.

In particular, the family interaction engine may determine which types of content and which specific content items to include on the family channel based on the current context and the saved user profiles. For example, if no one is detected in close proximity, the family interaction engine may automatically dim or turn off the screen, or the family interaction engine may display content that is relevant to all members of the family, such as news that matches the interests of all family members or upcoming calendar events for all members of the family. Furthermore, the family interaction engine may automatically tune the family channel content to individuals detected in close proximity. For instance, if Mom is the only user detected near the tablet, the family interaction engine may tune the content to be relevant to Mom, such as categories of videos that Mom likes, social networking updates for Mom, indications of unread email or messages received by Mom, and upcoming calendar events for Mom. Or, as indicated above, if Dad, Jill, and Jack are in the room, the family interaction engine may display information about shows or activities of interest to that specific group of users.

The family interaction engine may recognize users in the room through a combination of methods, and may then dynamically configure the family channel, to tailor both the type of containers (e.g., applications, widgets, feeds) as well as the type of content that would be preferred (e.g., type of application, type of feed, etc.). The family interaction engine may determine the area, shape, and display properties for each container from a pallet of options, and may then use those containers to display content on the screen. The family interaction engine may also refresh and change the content as new and relevant information becomes available for display. The family interaction engine may also provide settings that can be modified by users to control characteristics of the display (e.g., to set timing and transition effects).

The family interaction engine may automatically present the family channel when the tablet is at rest (e.g., when docked or charging while one or more members of the family are present). In addition or alternatively, a user may manually invoke or launch the family channel, for instance by selecting an application, a system widget, a menu item, or any other suitable trigger mechanism.

As indicated above, FIG. 3 depicts an example screen shot showing one example of the kinds of blended family content which the family interaction engine may display on the tablet. In one embodiment, the information and media rotate through at periodic intervals until the tablet meets sleep state criteria or until active engagement by a person. One of the containers (e.g., picture panel 922) may operate similarly to computer screen saver or an electronic picture frame, cycling through a set of pictures. However, other containers include other kinds of information, with the family channel including an amalgamation of content expected to be of broad interest to members of the family, based on stated preferences from individual user profiles and from the family user profile, relevant situational context, observed usage behavior for individual accounts and for the family user account, etc. For instance, the family interaction engine may dynamically configure the family channel to present news, applications, video and audio media items, photographs, calendar items, and other types of content that has broad interest to family members. Furthermore, in addition to changing specific content items, the family interaction engine automatically changes containers and general content categories or genres displayed on the family channel. Consequently, the blended content may be unique and compelling to each family, and the family channel may serve as a window into the family's interests.

In addition, the family channel may serve as a conduit to display family information. A service could collect information from and distribute information to all devices owned by family members. For instance, if Mom and Dad each own a smartphone, Mom and Dad may load a family interaction application (e.g., the family interaction engine) onto those phones and then use those phones to subscribe to a family channel service. In one embodiment, the family channel service is hosted by one or more remote devices, and the tablet (and/or other individual local devices) can be used to configure the service. The family channel service could then receive information from and provide information to the family channel application on each phone. For example, as described in greater detail below, local and remote devices may cooperate according to the computing model referred to in general as "the cloud."

In one embodiment, the family channel service ensures that the information provided to each device is contextually relevant for that device. For instance, the family channel service may adapt the content and information for the smaller sized screen of the smartphone, and the family channel service may limit and prioritize the information so that a smaller number of content items that match that user's preferences and interests are displayed. The family channel service may also consider the current location and activity of the user when deciding what information and content to provide (including different types of news items, videos, music, and applications). Additionally, the family channel service may relay the user's current location and activity to the tablet, so a user of the tablet can know where the smartphone user is and what he or she is doing.

Thus, family information could be distributed widely to all family members via their devices. For instance, if Mom updates her status in a social networking application, the family channel service might automatically add a container for the social networking application to the family channel for all subscribed devices, and then populate that container with Mom's status information.

Figure 10:
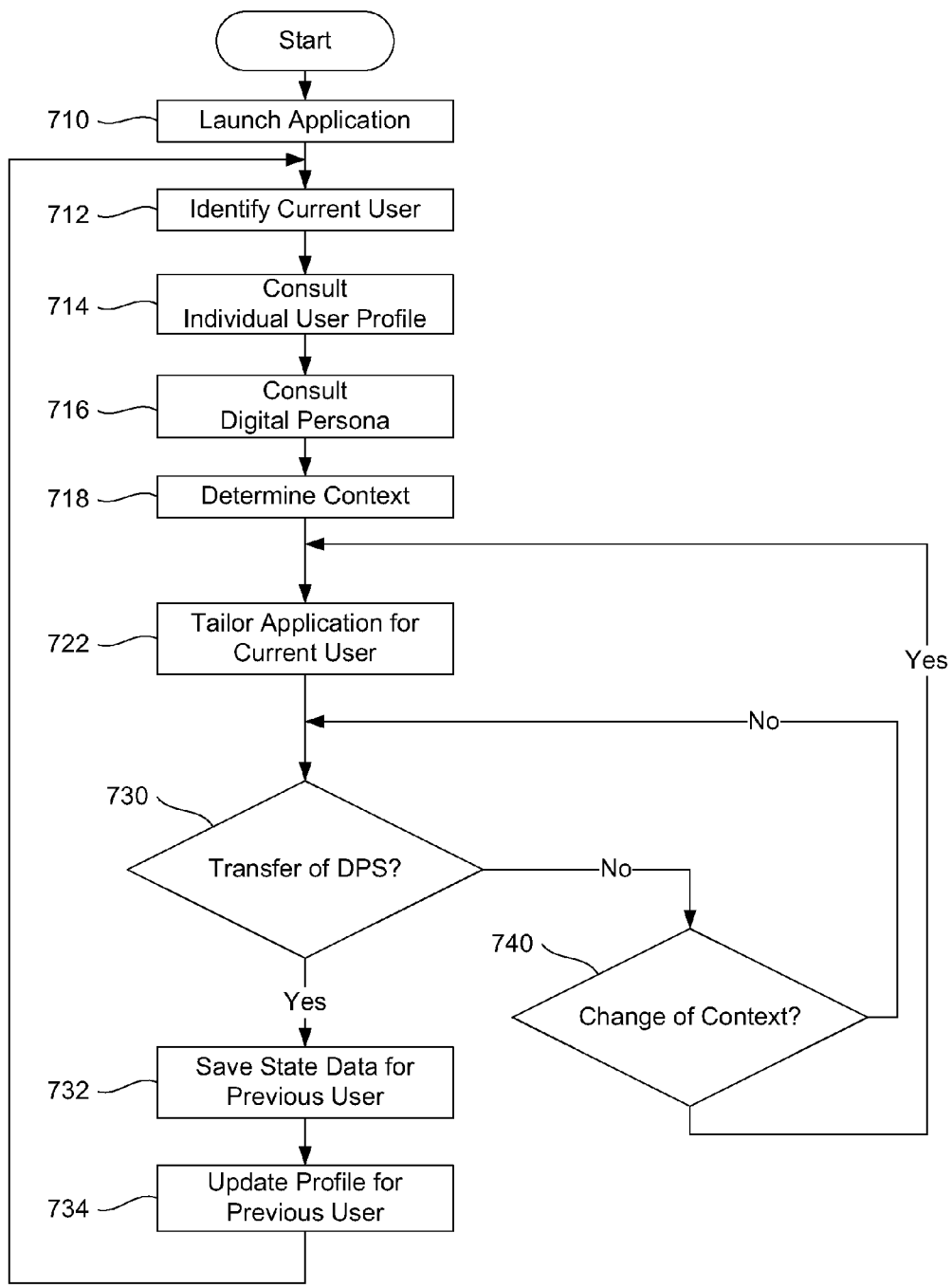
FIG. 10 is a flowchart of an example embodiment of a process for dynamically tailoring an application for the current user.

FIG. 10 presents a flowchart of an example embodiment of a process for dynamically tailoring an application for the current user. As indicated below, the tablet may dynamically tailor a running application for each uniquely recognized user, as they are recognized. In the illustrated embodiment, as depicted at block 710, the process may begin when the tablet launches an application. For purposes of illustration, the process of FIG. 10 is discussed primarily with regard to an entertainment or media application, such as a music player, a video player, a news reader, or an e-book reader. However, other types of applications may be used in other embodiments, including without limitation social networking applications, streaming or on-demand video services, Internet radio stations or other streaming music services, etc.

As indicated at block 712, the application tailoring module may then use any suitable technique to automatically identify the current user. For instance, the application tailoring module may use voice recognition and/or face recognition to determine which user is currently using the tablet, as indicated above.

In an example scenario, Mom and Dad, while sitting on a couch in the living room, are using the tablet to control a video player application on the tablet. In particular, the video player application has been configured to cooperate or integrate with a separate home theater system in the living room. Alternatively, applications may be configured to cooperate or integrate with other external or remote device, including without limitation external media devices, such as televisions, video game consoles, streaming video players, audio receivers, etc. In another scenario, applications may be configured to present both media and supplemental data on the tablet. In the example scenario, Mom has used the video player application to cause a selected program to be presented by a separate home theater system in the living room. Then, Mom and Dad may pass the tablet back and forth while watching that program (e.g., the Olympics).

When Mom first picks up the tablet to turn on the Olympics, the application tailoring module may use the tablet's camera to automatically detect that Mom is the current user. The tablet may also automatically login the current user, if necessary, as described above with regard to hand offs.

As shown at blocks 714 and 716, the application tailoring module may then consult the user profile for the current user, to identify any preferences for the current user that are relevant to the application. As indicated above, the application tailoring module may obtain the user preferences from the user profile and/or from a digital persona. In addition or alternatively, the application tailoring module may obtain the user preferences from a context framework. In addition, when the application tailoring module saves state data for a user as indicated below, the application tailoring module may save that state data to the context framework. The context framework may be implemented using any suitable system for storing data. The application tailoring module may communicate and cooperate with the context framework service via an API. This API may enable developers to leverage user information to build more feature rich applications.

In one scenario, the user profile for Mom indicates that, when watching a sports program, Mom is generally interested in—and likes the tablet to present—certain kinds of supplemental data pertaining to the program. For instance, Mom's profile may indicate that Mom likes to see data about the venue for the event, the historic significance of the venue, which celebrities are attending the event, and which company created the athletic uniforms. Mom's profile may also identify user preferences that are relevant to specific applications. For instance, Mom's profile may identify preferred settings (e.g., level of difficulty, controller settings, etc.) for different game applications. Game controller settings may also be considered user interface settings. Mom's profile may also identify preferred user interface settings or other application settings for other applications. For example, Mom's profile may specify a default folder for storing or retrieving data for a word processing application, a default home page for a web browser application, etc. Mom's profile may also identify preferences with regard to media applications. For example, Mom's profile may identify favorite movies and/or type of movies for a video service application, favorite songs or types of songs for a music streaming service, etc.

As shown at block 718, the application tailoring module may also determine the current context, including without limitation the location of the tablet, which users are near the tablet, the type of activity in process, the genre of any media being presented, and other details about media being presented, such as the identity of any participants in the media (e.g., sports teams, actors, etc.).

In the example scenario, the context may indicate that the user is alone watching a sporting event (e.g., the Olympics) on a television at home in the living room. The application tailoring module may then tailor the application for the current user and the current context, based on the data from the user profile and the current context data, as indicated at block 722. For instance, in the example scenario, the application tailoring module may determine appropriate supplemental content, based on the context, etc., and the application tailoring module may cause the video player application to display that supplemental content (e.g., data pertaining to the Olympic venue, etc.) Thus, the tablet may present interesting trivia relevant to whatever is being shown on the television, based on the known interests of the current user. Also, the application tailoring module and/or the video player application may be configured to cause the supplemental data to be presented on the tablet, on the home theater system, or both. Similarly, in a scenario involving a game application, the application tailoring module may automatically configure game difficulty, game controller settings, and/or other preferences for the game for the current user.

Moreover, the family interaction engine may automatically update a user profile and/or the digital persona associated with a particular user, based on observed behavior of that user. For example, the family interaction engine may detect, based on observed activity of a user, that the user tends to view (a) content items involving world news, business news, and stock prices in the morning; (b) current social network postings around lunchtime; and (c) entertainment-based content or sports recaps in the evening. Consequently, the application tailoring module may benefit from this kind of automatic learning, with the ability to automatically tailor applications automatically improving over time.

As shown at block 730, the application tailoring module may then determine whether the tablet has been transferred or handed off to a different user. If no transfer is detected, the application tailoring module may determine whether the context has changed, as shown at block 740. For instance, the application tailoring module may determine that the broadcast has shifted to a different venue (e.g., from a mountain for a ski race to an ice rink for a skating contest) or that the user has selected a different program altogether (e.g., a western movie). Other kinds of context changes may include (a) moving from one room in the house to another (e.g., from the living room to the kitchen), with recommended content changing from TV/entertainment to recipes), (b) other people coming into proximity of the tablet, (c) the time of day changing, or (d) moving to a different location altogether (e.g., from the house to the car). For example, the user profile may indicate that the user is interested in one kind of content in the morning (e.g., financial news) and then a different kind of content in the evening (e.g., sports or comedies). If the context has changed, the process may return to block 722, and the application tailoring module may automatically adjust the tailoring parameters according to the new context. For instance, if Mom has changed the channel from the Olympics to a western movie, the application tailoring module may configure the video player application to display supplemental data that provides information about the actors in the movie, based on user profile data indicating that Mom is interested in that kind of information.

However, referring again to block 730, if a transfer to a new user is detected, whoever was just using the tablet may then be considered the previous user, and the new user may be considered the current user. As shown at block 732, the application tailoring module may then cause the tablet to save state data for the previous user. The state data that is saved may include a copy of the existing "state" of the tablet (possibly the same as or similar to the data saved when a laptop goes to sleep), the list of applications and services in use and their associated data/settings, the GUI artifacts that were being displayed, an enumeration or history of the actions that last occurred on the tablet, the position of open media files (e.g., movies, songs) etc. This would allow for the re-enablement of existing state either on the same device, or potentially on other devices with compatible capabilities. If the current user (or "second user") subsequently hands the tablet back to the previous user (or "first user"), the application tailoring module may retrieve the saved state data for the first user and reconfigure the tablet back to the state that existed before the first user handed the tablet to the second user. For example, after the second user hands the tablet back to the first user, the process may return to block 712, and when the application tailoring module recognizes that the first user is now the current user, the application tailoring module may retrieve the state data that was saved for the first user. In some cases, after the tablet has been transferred, the tablet may be unable to determine who the new "current" user is. Such a handoff may be referred to as an incomplete or unsuccessful handoff. After an incomplete handoff, if the tablet is handed back to the first user, the tablet may automatically re-authenticate the first user and may then restore the state for the first user, as indicated above, without saving any state for the unidentified second user.

However, referring again to block 732, in conjunction with saving state for an identified previous user, the family interaction engine may also update the profile for the previous user, based on the recent interactions, as shown at block 734. For instance, if the behavior of the previous user included numerous interactions with supplemental data pertaining to ice skating, the family interaction engine may update the user profile of the previous user to identify ice skating as an interest of the previous user. The process may then return to block 712, and the application tailoring module may identify the current user and consult the user profile for that individual, etc., as indicated above.

For example, the application tailoring module may determine that Dad is now the current user, and the application tailoring module may determine that Dad is interested in sports statistics and that he is generally interested in athletes from the United State. And the context data may indicate that the user is watching the Olympics on a television at home. After aggregating all of these facts and preferences together, the tablet may determine that the user would appreciate sports statistics for the athletes from the U.S., and may display that type of supplemental content to the user. The augmented information now shown on the tablet is based on Dad's interests for the very same event, using the very same application. For instance, new data and diagrams could melt or flow into the video player application frame and provide augmented data to delight Dad. In other words, the application tailoring module may reconfigure the video player application without disengaging or starting the video player application. The application tailoring module may cause the video player application to incorporate the supplemental data for the new user into the flow of the currently running application.

In another scenario, Mom and Dad may be passing the tablet back and forth while using a social networking application. When Mom is holding the tablet, posts and updates from her friends and social network are displayed. However, when Mom gives the tablet to Dad, the social networking application instantly refreshes to show Dad's recent postings, his friends, and their updates. Also, their user profiles may indicate that Mom prefers the social networking application to sort status updates based on importance and Dad prefers the social networking application to sort status updates based on time. Accordingly, when Mom is holding the tablet, the application tailoring module may configure the social networking application to show the most important status updates at the top. And when Dad is holding the tablet, the application tailoring module may configure the social networking application to show the most recent status updates at the top.

In another scenario, Mom and Dad may be passing the tablet back and forth while using a word processing application. Also, their user profiles may indicate that Mom uses one default folder and Dad uses a different default folder. Accordingly, when Mom is holding the tablet, the application tailoring module may cause the word processing application to use Mom's default folder. And when Dad is holding the tablet, the application tailoring module may cause the word processing application to use Dad's default folder.

Other potential scenarios include (a) a news aggregator application, and the user profiles may indicate that Dad prefers sports news and scores from local teams, while Mom prefers design and architecture news, and Jill prefers entertainment/celebrity news; (b) a streaming music player, and the user profiles may indicate that Dad prefers classical, Mom prefers jazz, and Jack prefers pop; (c) a computer game that automatically loads levels, saved games, and player attributes for the current user; etc.

A tablet, smartphone, or other data processing system may have hundreds of applications installed on the platform. To navigate and get to a specific application that a user needs while on-the-go becomes increasingly time consuming. Shortcuts or links to launch applications may be organized by categories in a hierarchy or alphabetically ordered in a flat structure. In a convention data processing system, the organization is fixed and does not change according to the dynamic context of the platform.

Figure 11:
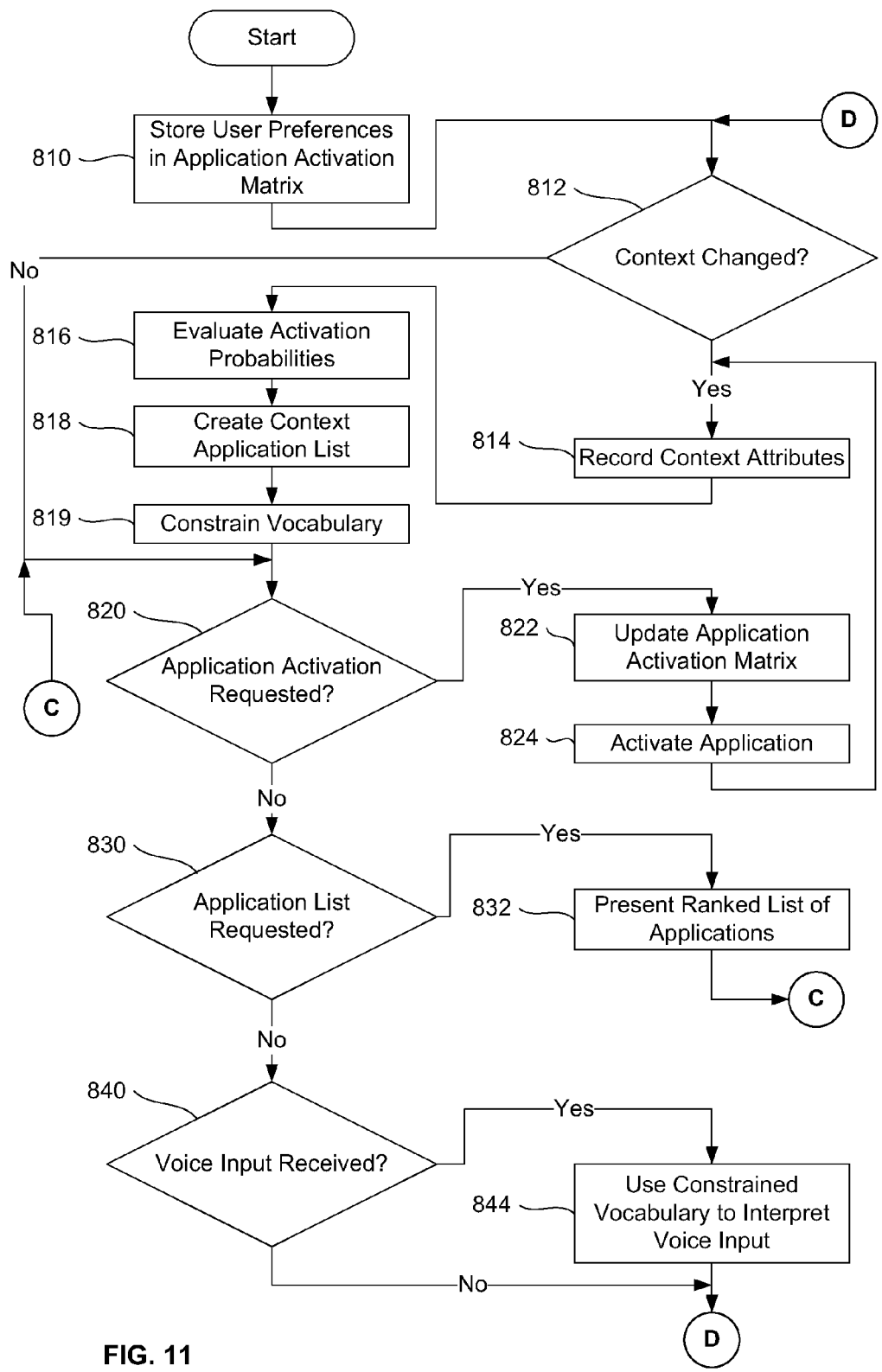
FIG. 11 presents a flowchart of an example embodiment of a process for automatically ranking applications for presentation.

FIG. 11 describes an example embodiment of a process for providing improved access to applications. That process may provide easy access to a user's favorite and most useful applications and content at the right time and location based on user habit and dynamic context.

The flowchart of FIG. 11 illustrates an example embodiment of a process for automatically ranking applications for presentation. That process may begin with an individual user signed in to the tablet. As shown at block 810, the tablet may store preferences for the current user. For example, application ranking module may provide an interface for the user to pre-populate the application activation matrix (described below) with information about the applications that the user utilizes most frequently in different situations. That interface may also allow the user to specify different contexts that are important or relevant for one or more applications, such as an at home context, an at work context, a commuting context, a traveling context, an at a café context, etc. Accordingly, the user may also store data that identifies a music player application as a preferred application whenever the user is commuting to and from work, for example. Thus, the application activation matrix may be initialized by the user with default values. For instance, the application ranking module may use this data from the user to create a default application activation matrix. Subsequently, as described in greater detail below, the application ranking module may automatically adjust the application activation matrix in response to observed usage patterns of the user. In one embodiment, the application ranking module uses a separate application monitoring process (AMP) to track application usage and device context, and to continuously maintain and update the application activation matrix. The AMP may run in the background of the tablet and provide information on what applications are running, for how long, what content has been played, and so forth. The application ranking module may then use this information to update the application activation matrix to correlate the device usage with the current user profile and the current general context. Thus, the AMP provides basic information pertaining to the applications being used, and the application ranking module uses that information to maintain the application activation matrix and the probability transition matrix.

In another scenario, the user may be logged in to the family user account, and the user may then set parameters for that account. The application ranking module may maintain separate data for each different user. For instance, the application ranking module may build a personalized application activation matrix for each user, and may refine the application activation matrix over time to support easy access to each user's favorite and most useful applications and content at the right time and location.

The application ranking module may support such functionality by automatically learning users' preferences through monitoring and building a probability transition matrix between applications that is context dependent. The probability transition matrix may be referred to as an application activation matrix. The application ranking module may monitor and track aspects of context including without limitation semantic location, time of day, activity (e.g., driving, dining, etc.). For purposes of this disclosure, the term "semantic location" denotes the location of the tablet and the user, as relevant to the activity of the user. For instance, the application activation matrix may identify the semantic location as in the living room, in the kitchen, at home, at the office, at the gym, at the grocery store, at a bookshop, at the library, at school, at a café, at an airport, at a bus stop, commuting on a train, commuting in a car, etc.

In one scenario, the application activation matrix may indicate that, if the tablet is being used at an airport, there is a high probability that the user will want to launch a travel application from a home screen. The application activation matrix may also indicate that, while the user is browsing within the travel application, if the time is close to meal time, the probability of jumping to a food recommendation application is high. And the application ranking module may determine that, if the time is close to the user's flight boarding time, the shortcut to put the device into "airplane mode" should be on the top of the application list. Another example is for the application ranking module to bring a data usage application to the top when the user is browsing the web or streaming video through a third generation or fourth generation (3G/4G) connection, so the user can easily monitor his or her data usage, to avoid exceeding data plan limits. Accordingly, the application ranking module may present a tailored list of applications that includes only the applications with a relatively high likelihood of being desired, in ranked order of predicted activation.

In addition, the application ranking module may associate the current time with calendar events and may rank applications based on such associations. Such calendar events may include events such as birthday celebrations, wedding anniversaries, flight boarding times, etc. In particular, the application ranking module may use the calendar data to interpret the "time" context that is stored in the application activation matrix for calendar events. For example, the application ranking module may cross reference the current time with the third row in the application activation matrix of FIG. 12 to determine that it is boarding time for a scheduled flight, and that the airplane mode widget is the top ranked application in that context.

FIG. 12 presents an example application activation matrix (AAM) 95 which identifies the transition probability from a currently running application to the next application, constrained by the current context (including semantic location, time of day, and user activity). Contextual attributes may also be identified as a wildcard (e.g., "Any"), meaning the specific transition probability is unconstrained by the corresponding contextual attribute. Each row in the table can be seen as a filtering rule to limit the potential applications that should be retained for a context application list (CAL) 97. A smart shortcut manager iterates through the table and applies each rule against the current detected context. The smart shortcut manager may also be referred to as an application ranking module. The application ranking module may store rules that match the current context in the context application list. At the end of the iterating process, only a handful of rules may be found in the context application list. The application ranking module may then rank the rules in the context application list according to the transition probability value. The application ranking module may then determine which applications are identified by those rules as most likely to be used next, and the application ranking module may present the user with selectable identifiers for one or more of those top-ranked applications, in rank order, thereby allowing the user to easily launch any of those presented applications. Thus, applications with higher transition probabilities that match the current context will be placed higher on the context application list, giving the user easier access to these applications at the moment. The context application list may also be referred to as a ranked application list.

In the embodiment of FIG. 12, the first and second rows indicate that, if the user is driving, the probability that the user will want to launch or use a map application is fairly high (70%), and the probability that the user will want to use an email application is low (10%). The third row indicates that if the application ranking module determines that the user is about to board a plane (based on the user being in an airport and the current time being near the scheduled boarding time, as reflected in calendar data for the user), there is a high probability (97%) that the user will want to access a widget for placing the tablet in airplane mode. The remaining rows associate transition probabilities for potential "next" applications with other semantic locations, times, activities, and "current" applications.

In one embodiment, the application ranking module enables the user to associate different times or time periods with corresponding high-level semantic meanings that are personalized to the user. The application ranking module may also automatically link high-level semantics meanings with different time periods, based on observed usage patterns. For example, the application ranking module may learn that weekdays from 8:00 to 8:30 AM and from 6:00 to 6:30 PM are the user's typical commute times. Similarly, the application ranking module may record data indicating that 8:00 AM, 1:00 PM, and 6:00 PM are the user's typical meal times during weekdays, and 10:00 AM, 2:00 PM, and 8:00 PM are the user's typical meal times during weekends/holidays.

Referring again to FIG. 11, as depicted at block 812, the application ranking module may monitor the context of the tablet (e.g., the current application, the current time, the current semantic location, and the current activity). When the context changes, the application ranking module may automatically record the current context attributes, as shown at block 814. Those context attributes may include without limitation the current application, the current time, the current semantic location, and the type of activity being engaged in by the user. For instance, the application ranking module may determine the present semantic location by reverse geocoding the GPS coordinates using a web mapping service application such as the one known as Google Maps. The application ranking module may determine the present activity by interpreting motion sensing data (e.g., from accelerometer, gyro, etc.) available on the tablet, for instance. In addition, as indicated at block 816, the application ranking module may automatically evaluate the probability of activation for each of the applications that are installed on the tablet, based on the current context. As shown at block 818, after evaluating the probabilities of activation for each application, the application ranking module may then create the context application list, based on the application activation matrix and the current context data. For example, when building the context application list, the application ranking module may omit any rows associated with a time, an activity, a semantic location, or a current application that differs from the current context. Also, when creating the context application list, the application ranking module may order the rows in the list in decreasing order of transition probability.

In addition, as described in greater detail below, the application ranking module may include or cooperate with a UI for accepting voice-based input. As shown at block 819, whenever the context application list changes, the application ranking module may cause that voice-based UI to constrain or limit the vocabulary to be used for interpreting spoken input, based on meta-data for the current application and a certain number (e.g., one or two) of the currently top ranked "next" applications.

As depicted at block 820, the tablet may then determine whether application activation has been requested. In other words, the application ranking module may determine whether the user has launched or resumed use of an application other than the current application. If application activation has been requested, the application ranking module may update the activation matrix accordingly, as shown at block 822. For instance, if the requested application is being launched for the first time, the application ranking module may create a new row in the application activation matrix to identify the requested application as the "next" application, along with data on the present context attributes (e.g., the current semantic location, time, activity, and application). The application ranking module may also add a new row if the requested application is being launched for the first time in a particular context. Or, if the application activation matrix already contains a row for the requested "next" application in the current context, the application ranking module may update or adjust the transition probability for that row, as well as the transition probabilities for any other "next" applications with rows for the current context. Consequently, the application ranking module may automatically adapt to changing user preferences. After updating the application activation matrix, the application ranking module may launch (or otherwise activate) the requested application, as shown at block 824. Then, since the current application has changed, and the current application is part of the context, the process may pass to block 814, with the application ranking module recording the new context attributes, re-revaluating application activation probabilities, and revising or recreating the context application list, as described above.

However, referring again to block 820, if application activation has not been requested, the application ranking module may determine whether the user has requested a ranked application list, as indicated at block 830. If the user has requested a list of ranked applications, the application ranking module may present the list of ranked application on the tablet, as shown at block 832. For instance, the application ranking module may present links or shortcuts to each of the applications in the ranked application list, ranked in decreasing order of transition probability. For purposes of this disclosure, the terms "link" and "shortcut" may be used to refer to icons, buttons, items in a drop down list, or any other type of object or item presented by a data processing system to enable the user to activate an application or other content item. The process may then pass through connector C to block 820, and the application ranking module may determine whether the user has selected one of the listed applications for activation. If the user has selected an application for activation, the application ranking module may process that request as described above with respect to blocks 822, 824, etc.

Referring again to block 820, in a relatively basic embodiment, to request the ranked application list, the user may touch a specific region on the screen, press a button on the screen, or press a physical hotkey on the device. In an advanced embodiment, the application ranking module may make the ranked application list accessible through a UI that recognizes gestures. For example, the UI may enable the user to navigate sequentially through shortcuts to the applications in the ranked application list by making a particular gesture or movement, including without limitation by (a) holding the tablet with two hands on the two short edges and shaking the device back and forth towards the left and right, or up and down, or (b) simply shaking the tablet to advance in the list. In one embodiment, a gesture UI may allow the user to cycle through a predetermined number (e.g., three) of shortcuts to top ranked applications for the current context via natural gestures.

In one embodiment, instead of displaying contextually relevant applications in a list, the application ranking module may organize the applications (or shortcuts to the applications) graphically to stress relevance. For example, in one embodiment, applications that are most relevant could be displayed on the first page of the home screen, and less relevant applications could be displayed off-screen (e.g., on other pages of the home screen). In a different embodiment, the most relevant applications could be displayed along with content in the home screen UI, for example as graphical user interface (GUI) widgets. For instance, a widget of a video streaming application can be presented, showing in its box the latest releases or the movies that are suggested for the current user by the video streaming application.

In another embodiment, the application ranking module may keep a widget on the home screen, where the widget always include a shortcut to the top ranked "next" application. The application ranking module my thereby enable the user to activate the top ranked application with a single click, touch, or gesture.

However, referring again to block 830, if the user has not requested a ranked application list, the process may pass to block 840, which shows the application ranking module determining whether the tablet has received voice input or spoken input.

As indicated above, the application ranking module may include or cooperate with a voice-based UI that utilizes meta-data from a predetermined number of top ranked applications (e.g., one, two, three, or more) to constrain the vocabulary for interpreting the spoken input. If voice input has been received, the voice-based UI may use the constrained vocabulary to interpret that voice input, as depicted at block 844. For example, the voice-based UI may be part of the OS, and user may use the constrained vocabulary to launch one of the top ranked applications. Alternatively, the user may use the constrained vocabulary to activate a feature supported by one of the top ranked applications (e.g., call home).

By enabling the voice-based UI to constrain the vocabulary to a certain number of the applications that are most likely to be used in the current context, the application ranking module may help to provide for improve command recognition accuracy in noisy environments (e.g., at an airport).

After the voice input has been interpreted, or if no voice input is received, the process may return to block 812 through connector D, and the application ranking module may continue adapting to changing conditions, as indicated above. Thus, as has been described, the application ranking module uses context awareness to improve the organization and presentation of shortcuts to applications. By learning and adapting to user preferences and activities observed over time, the application ranking module provides for a UI experience that is optimized and personalized for each different user. As indicated above, the application ranking module also supports a one-click or one-gesture experience to activate one's most useful application at any place, anytime.

In one embodiment, the application activation matrix also includes data concerning specific items or types of content, such as favorite songs, movies, artists, etc., and based on that data and the current context data, the application ranking module automatically includes one or more of those content items in the ranked list of applications, if appropriate. For instance, if the application activation matrix indicates that Dad usually plays a certain song when driving home from work on Friday, the application ranking module may present that song at or near the top of the list of ranked applications in response to detecting that Dad is driving home on a Friday. Similarly, an in-progress movie could be included in the list of ranked applications when the data processing system detects that the user in a context conducive for watching a movie, such as on the train.

Any suitable operating environment and programming language (or combination of operating environments and programming languages) may be used to implement components described herein. For example, in one embodiment, some or all of the family interaction engine is written in the object-oriented programming language known as "Java," and some or all the family interaction engine runs on top of a more or less conventional personal computer OS on the tablet. The application ranking module may be implemented as an application manager, the voice-based UI may be implemented as a digital personal assistant, and they may work together via any inter-process communication (IPC) mechanisms available on the platform. In another embodiment, some or all of the family interaction engine is written in a combination of the scripting languages known as "PHP" and "JavaScript," and the family interaction functionalities are split between a local client and an engine that runs on top of a Unix-like OS on a remote server. For example, basic UI functions of the family interaction engine may be performed by a web browser on a client device, while other functions are performed on one or more remote servers. In other embodiments, other types of programming languages and operating environments may be used.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

As used herein, the terms "processing system" and "data processing system" are intended to broadly encompass a single machine, or a system of communicatively coupled machines or devices operating together. For instance, two or more machines may cooperate using one or more variations on a peer-to-peer model, a client/server model, or a cloud computing model to provide some or all of the functionality described herein. Those variations on the cloud computing model may include the computing service architectures referred to as infrastructure as a service ("IAAS), platform as a service ("PAAS"), software as a service ("SAAS"), or any other suitable architecture. For instance, a television may include minimal compute and storage resources, and the television may use one or more applications, storage space, and other computing resources on one or more remote devices to provide some or all of the functionality described herein. Similarly, applications and/or other data (e.g., user profiles) that are described above as residing on a particular device in one example embodiment may, in other embodiments, reside on one or more other devices. And computing operations that are described above as being performed on one particular device in one example embodiment may, in other embodiments, be executed by one or more other devices. The device or devices which cooperate to form the data processing system may provide a user experience that is familiar across different user interface devices, while also being tailored to those different user interface devices. For instance, a tablet with one or more sensors may send data to a remote device in the cloud, and that remote device may host the family interaction engine. The hosted family interaction engine may determine which users, if any, are near the tablet, based on the sensor data received from the tablet. Thus, the family interaction engine may exist as a service independently of the tablet. Other logical component or modules may also be implemented as remotely hosted services. In one embodiment using the cloud computing model, the individual profiles for the family members are stored outside of the tablet (e.g., in the cloud), and individual profiles are copied, transmitted, or pushed down to devices as needed. For instance, a smartphone may send an image of the face of the current user to the cloud, and in response the cloud may determine which user has that face, and may then send the individual profile for that user to the smartphone. Also, users may be designated as members of a family, and one or more tablets (or other devices) the family may be designated as belonging to that same family. Also, the family interaction engine may blend all of the individual profiles that were designated as part of a family in the cloud to create the family profile, and the family interaction engine may push that family profile down to each device belonging to the family. The family interaction engine may also regularly push down updates to the individual profiles and the family profile. Consequently, when a person or "visitor" borrows a tablet (or other device) from someone else, the tablet may initially allow access via a guest account. However, if the family interaction engine in the cloud is able to identify the visitor and find a profile for the visitor, the family interaction engine may push that profile down to the tablet. The tablet may then automatically reconfigure itself, based on the visitor's profile. However, the tablet may be configured with restricted permission for certain users, for instance to prevent access to the printer and/or other devices and functions.

Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a tablet) should be understood as encompassing other types of data processing systems, as well.

Also, unless expressly specified otherwise, components that are described as being coupled to each other, in communication with each other, responsive to each other, or the like need not be in continuous communication with each other and need not be directly coupled to each other. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, configuration settings, and other kinds of data. As described above, when the data is accessed by a machine, the machine may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. Instead, the scope of the invention is intended to cover many different embodiments, including without limitation embodiments with the features described in the following paragraphs.

(A1) A method facilitates multi-user interaction with a data processing system. The method involves a data processing system with individual user profiles for respective individual users and with a family user profile for a collective family user. The data processing system automatically determines a first set of content items for a family channel, based at least in part on the family user profile. The data processing system automatically presents the family channel when the family user profile is open. After automatically determining the first set of content items for the family channel, one of the individual user profiles is modified, based on interaction with the data processing system by the corresponding individual user. After modifying the individual user profile, the family user profile is automatically modified, based on the modified individual user profile. The data processing system automatically determines a second set of content items for the family channel, based at least in part on the modified family user profile.

(A2) A method according to paragraph A1 further comprises: automatically determining whether all of the individual user profiles are inactive; and automatically presenting the family channel in response to a determination that all of the individual user profiles are inactive.

(A3) A method according to paragraph A1 further comprises automatically cycling through different items from the first set of content items when presenting the family channel on the data processing system.

(A4) In a method according to paragraph A1, the second set of content items comprises at least two items from the group consisting of a calendar event, a photo, a video, a favored music file, and weather information.

(A5) In a method according to paragraph A1, the individual user profiles comprise a first user profile for a first user and a second user profile for a second user. And the method further comprises: after the first user has signed in to the data processing system, presenting a first set of recommendations for content predicted to be of interest to the first user; presenting the first user with an option for selecting the second user to be included for purposes of recommendations, and receiving input from the first user selecting the second user to be included for purposes of recommendations; and in response to receiving the input from the first user selecting the second user to be included for purposes of recommendations, automatically presenting at least one recommendation from a second set of recommendations for content predicted to be of interest to the first user and the second user.

(A6) A method according to paragraph A5 further comprises, in response to receiving the input from the first user selecting the second user to be included for purposes of recommendations, automatically determining the second set of recommendations for content predicted to be of interest to the first user and the second user.

(A7) A method according to paragraph A5, further comprises: automatically determining content items for a home screen of the first user; and automatically including, among the content items for the home screen of the first user, at least one recommendation for content predicted to be of interest to the first user.

(A8) In a method according to paragraph A5, the operation of presenting the first user with an option for selecting a second user to be included for purposes of recommendations comprises presenting a selectable identifier for the second user; and the operation of automatically presenting at least one recommendation from a second set of recommendations for content predicted to be of interest to the first user and the second user is performed in response to user input selecting the selectable identifier for the second user.

(A9) In a method according to paragraph A8, the operation of presenting a selectable identifier for the second user comprises presenting selectable identifiers for all users with user profiles on the data processing system.

(A10) A method according to paragraph A5 further comprises: in response to receiving the input from the first user selecting the second user to be included for purposes of recommendations, automatically notifying a remote application that the second user has been selected to be included for purposes of recommendations; and after notifying the remote application that the second user has been selected to be included for purposes of recommendations, receiving the second set of recommendations from the remote application. And the operation of automatically presenting at least one recommendation from a second set of recommendations for content predicted to be of interest to the first user and the second user is performed in response to receiving the second set of recommendations from the remote application.

(A11) A method according to paragraph A5 further comprises: automatically detecting whether a person with a user profile for the data processing system is near the data processing system; and in response to automatically detecting that a person with a user profile for the data processing system is near the data processing system, automatically causing the detected person to be included for purposes of recommendations.

(A12) A method according to claim paragraph A11 further comprises: presenting the first user with an option for activating automatic group recommendations; and receiving user input selecting the option for activating automatic group recommendations. And the operation of automatically detecting whether a person with a user profile for the data processing system is near the data processing system is performed in response to receiving the user input selecting the option for activating automatic group recommendations.

(B1) Another method facilitates multi-user interaction with a data processing system. The method involves a data processing system with multiple content items, with multiple individual user accounts for multiple respective individual users, with a corresponding individual user profile for each individual user account, with a family user account for a collective family user, and with a family user profile corresponding to the family user account. According to the method, one of the individual user accounts is opened in response to a current user logging in to the data processing system. In response to a determination that the current user has selected a content item among the multiple content items for sharing, the data processing system presents one or more selectable user identifiers for one or more other individual users and the data processing system presents a selectable user identifier for the family user. In response to determining that the current user has selected the user identifier for the family user, the family user profile is automatically modified to identify the selected content item as having been shared with the family user. And when the family user account is open, the data processing system displays a home screen for the family user that contains information about the selected content item that was shared with the family user.

(B2) A method according to paragraph B1 further comprises: in response to determining that the current user has selected a user identifier for another individual user, automatically modifying the corresponding individual user profile to identify the selected content item as having been shared with the selected individual user; and when the user account for the selected individual user is open, displaying a home screen for the selected individual user that contains information about the selected content item that was shared with the selected individual user.

(B3) In a method according to paragraph B1, the data processing system comprises a list of contacts for the current user; and the method further comprises receiving user input that selects at least one individual from the list of contacts for inclusion as a potential recipient.

(B4) A method according to paragraph B1 further comprises: automatically detecting one or more remote devices near the data processing system; presenting one or more selectable device identifiers for the one or more remote devices: and in response to determining that the current user has selected a device identifier, automatically sending the selected content item to the selected device.

(B5) A method according to paragraph B4 further comprises: automatically determining a direction from the data processing system to at least one of the remote devices; automatically determining whether the current user has moved the identifier for the selected content item towards one of the remote devices; and in response to determining that the current user has moved the identifier for the selected content item towards one of the remote devices, automatically sending the selected content item to the remote device towards which the identifier for the selected content item was moved.

(B6) A method according to paragraph B5 further comprising saving a configuration setting that selects among multiple content display options for the user account of the current user. Also, the content display options comprise: a first option configuring the data processing system to automatically display content that has been sent to the data processing system; and a second option configuring the data processing system to automatically display a notification that content has been sent to the data processing system.

(B7) A method according to paragraph B4 further comprises presenting multiple sharing options for the selected content item, wherein the multiple sharing options comprise at least one identifier for a first set of potential recipients for the selected content item and at least one identifier for a second set of potential recipients for the selected content item. The at least one identifier for the first set of potential recipients comprises at least one of the user identifiers. The at least one identifier for the second set of potential recipients comprises at least one of the device identifiers.

(B8) In a method according to paragraph B7, the user identifiers comprise a name and a picture for at least one of the other individual users, and the at least one device identifier comprises a name and a picture for at least one individual user associated with at least one of the other devices.

(B9) A method according to paragraph B4 further comprises presenting at least two different sets of potential recipients for selected content item, wherein first set of potential recipients comprises at least one of the user identifiers, and the second set of potential recipients comprises at least one of the device identifiers.

(B10) In a method according to paragraph B1, the data processing system performs the operation of presenting one or more selectable user identifiers for one or more respective other individual users and presenting a selectable user identifier for the family user in response to the current user selecting the content item for sharing. Also, the method further comprises determining that the current user has selected the content item for sharing in response to a determination that the current user has dragged an identifier for the selected content item to an edge of a display for the data processing system.

(B11) In a method according to paragraph B1, the current user comprises a first user; the one or more selectable user identifiers comprise an identifier for a second user; and the method further comprises: automatically determining whether the first user is hovering an identifier for the selected content item over the identifier for the second user; in response to determining that the first user is hovering the identifier for the selected content item over the identifier for the second user, automatically presenting the first user with options for selecting among multiple devices associated with the second user; and in response to determining that the first user has selected one of devices associated with the second user, automatically sending the selected content item to the selected device associated with the second user.

(B12) In a method according to paragraph B1, the individual users comprise first and second members of a family; the selected content item comprises a video featuring the first member of the family; and the operation of, when the family user account is open, displaying a home screen for the family user that contains information about the selected content item that was shared with the family user comprises automatically presenting at least part of the video featuring the first member of the family in a widget item on the home screen for the family user.

(C1) Another method facilitates multi-user interaction with a data processing system. The method involves a data processing system with a first user profile for a first user and a second user profile for a second user. The method comprises the operations of automatically determining, when the first user profile is open, whether the first user has handed the data processing system to another person; and in response to determining that the first user has handed the data processing system to another person, automatically determining an identity of the other person and automatically presenting transfer options on the data processing system. And when the other person comprises the second user, the transfer options comprise an identifier for the first user and an identifier for the second user, and the transfer options provide for selection from among at least two options from the group consisting of: keeping the first user profile open; automatically signing the first user out and signing the second user in; and temporarily opening the second user profile without signing the first user out.

(C2) A method according to paragraph C1 further comprises, in response to user selection of one of the transfer options, automatically executing the selected transfer option.

(C3) A method according to paragraph C1 further comprises: in response to detecting that the identifier for the second user has been pushed off of the display, determining that the option for keeping the first user profile open has been selected; and in response to detecting that the identifier for the first user has been pushed off of the display, determining that the option for automatically signing the first user out and signing the second user in has been selected.

(C4) A method according to paragraph C3 further comprises, in response to detecting that the identifier for the second user has been pulled toward the center of the display, determining that the option for temporarily opening the user profile for the second user without signing the first user out has been selected.

(C5) In a method according to paragraph C1, the transfer options further provide for selection of an option to keep the first user profile open while adding the second user to a recommendation group.

(C6) A method according to paragraph C5 further comprises, in response to detecting that the identifier for the second user has been selected, determining that the option to keep the first user profile open while adding the second user to the recommendation group has been selected.

(C7) A method according to paragraph C1 further comprises, in response to expiration of a predetermined time period without the identifiers for the first and second users being selected, determining that the option for keeping the first user profile open has been selected and automatically removing the identifiers for the first and second users from the display.

(C8) In a method according to paragraph C1, the operation of automatically determining an identity of the other person comprises automatically using at least one technology from the group consisting of face recognition technology and voice recognition technology to determine the identity of the other person.

(D1) Another method facilitates multi-user interaction with a data processing system. The method involves a data processing system with individual profiles for respective individual users and with a family profile for a collective family user. The method comprises the operations of automatically detecting whether a person is near the data processing system, and in response to detecting the person near the data processing system, automatically determining whether the detected person is one of the individual users with individual profiles on the data processing system. The method also comprises, in response to a determination that the detected person is one of the individual users with individual profiles on the data processing system, automatically determining a set of content items to be presented, based at least in part on a combination of information from the individual profile for the detected person and information from the family profile. The method also comprises, after determining a set of content items to be presented, automatically causing at least some of the items from the set of content items to be presented.

(D2) In a method according to paragraph D1, the operation of automatically determining a set of content items to be presented comprises recognizing interests of the family user and interests of the detected person; evaluating potential content items, with regard to relevance to the recognized interests of the family user; evaluating potential content items, with regard to relevance to the recognized interests of the detected person; including potential content items with high relevance to the recognized interests of the family user in the set of content items to be presented; and including potential content items with high relevance to the recognized interests of the detected person in the set of content items to be presented.

(D3) In a method according to paragraph D2, the operation of automatically determining a set of content items to be presented comprises analyzing potential content items from multiple sources, with regard to relevance to at least one factor from the group consisting of the recognized interests of the family user and the recognized interests of the detected person.

(D4) In a method according to paragraph D3, the multiple sources comprise at least one source from the group consisting of predetermined preferences for at least one individual user, predetermined preferences for the family user, behavior observation data, and a digital persona service.

(D5) A method according to paragraph D1 further comprises, after automatically causing at least some of the items from the set of content items to be presented, automatically determining whether a newer content item is available; and in response to a determination that a newer content item is available, automatically causing the newer content item to be presented, in place of an older content item.

(D6) A method according to paragraph D1 further comprises, after automatically causing at least some of the items from the set of content items to be presented, automatically determining whether context of the data processing system has changed; and in response to a determination that context of the data processing system has changed, automatically modifying the set of content items to be presented, based at least in part on the changed context.

(D7) A method according to paragraph D1 further comprises automatically determining a set of container objects to be presented in a family channel, based at least in part on predetermined user settings; organizing at least some of the content items into the container objects; automatically determining whether context for the data processing system has changed; and in response to a determination that context for the data processing system has changed, dynamically changing the set of container objects to be presented in the family channel.

(D8) In a method according to paragraph D1, the set of content items comprises at least two items from the group consisting of a stock ticker, a photo, a video, a music file, a news feed, a family calendar, a family favored photo, a family favored video, a family favored music file, a health update, a school web site, a teacher update, a note from one individual user to the family, and an entertainment application.

(E1) A method for dynamically tailoring supplemental data to be presented involves a data processing system with individual profiles for respective individual users, wherein the individual profiles comprise a first user profile for a first user and the first user profile identifies at least one interest of the first user. The method comprises the operations of determining that the first user is interacting with the data processing system while media content is being presented; in response to determining that the first user is interacting with the data processing system while the media content is being presented, automatically analyzing supplemental data to determine whether the supplemental data is relevant to the media content and to the interest of the first user identified in the first user profile; and in response to determining that the supplemental data is relevant to the media content and to the interest of the first user identified in the first user profile, automatically causing the supplemental data to be presented.

(E2) In a method according to paragraph E1, the individual profiles comprise a second user profile for a second user, and the second user profile identifies at least one interest of the second user. Also, the method further comprises automatically detecting that the second user is interacting with the data processing system while the media content is being presented; in response to determining that the second user is interacting with the data processing system while the media content is being presented, automatically analyzing additional supplemental data to determine whether the additional supplemental data is relevant to the media content and to the interest of the second user identified in the first user profile; and in response to determining that the additional supplemental data is relevant to the media content and to the interest of the second user identified in the first user profile, automatically causing the additional supplemental data to be presented.

(E3) In a method according to paragraph E2, the operation of automatically causing the additional supplemental data to be presented comprises causing the supplemental data to be replaced by the additional supplemental data.

(E4) In a method according to paragraph E1, the operation of automatically analyzing supplemental data to determine whether the supplemental data is relevant to the media content and to the interest of the first user identified in the first user profile comprises analyzing information from multiple sources.

(E5) In a method according to paragraph E4, the multiple sources comprise at least two items from the group consisting of individual user-specified preferences, behavior observation data, and a digital persona service.

(E6) A method according to paragraph E1 further comprises detecting another device near the data processing system; sending information to the other device; and receiving information from the other device. The other device presents the media content. And the operation of automatically analyzing supplemental data to determine whether the supplemental data is relevant to the media content and to the interest of the first user identified in the first user profile comprises analyzing the information received from the other device.

(E7) A method according to paragraph E1 further comprises automatically using state data pertaining to the supplemental data for the first user to update the first user profile, in response to detecting that the first user is interacting with the data processing system while the media content is being presented.

(F1) A method for facilitating multi-user interaction involves a data processing system with individual profiles for respective individual users and with a family profile for a collective family user. The method comprises the operations of automatically detecting whether a person is near the data processing system; in response to detecting the person near the data processing system, automatically determining whether the detected person is one of the individual users with individual profiles on the data processing system; in response to a determination that the detected person is one of the individual users with individual profiles on the data processing system, automatically determining a set of content items to be presented, based at least in part on a combination of information from the individual profile for the detected person and information from the family profile; and after determining a set of content items to be presented, automatically causing at least some of the items from the set of content items to be presented.

(F2) In a method according to paragraph F1, the operation of automatically determining a set of content items to be presented comprises recognizing interests of the family user and interests of the detected person; evaluating potential content items, with regard to relevance to the recognized interests of the family user; evaluating potential content items, with regard to relevance to the recognized interests of the detected person; including potential content items with high relevance to the recognized interests of the family user in the set of content items to be presented; and including potential content items with high relevance to the recognized interests of the detected person in the set of content items to be presented.

(F3) In a method according to paragraph F2, the operation of automatically determining a set of content items to be presented comprises analyzing potential content items from multiple sources, with regard to relevance to at least one factor from the group consisting of the recognized interests of the family user and the recognized interests of the detected person.

(F4) In a method according to paragraph F3, the multiple sources comprise at least one source from the group consisting of predetermined preferences for at least one individual user, predetermined preferences for the family user, behavior observation data, and a digital persona service.

(F5) A method according to paragraph F1 further comprises, after automatically causing at least some of the items from the set of content items to be presented, automatically determining whether a newer content item is available; and in response to a determination that a newer content item is available, automatically causing the newer content item to be presented, in place of an older content item.

(F6) A method according to paragraph F1 further comprises, after automatically causing at least some of the items from the set of content items to be presented, automatically determining whether context of the data processing system has changed; and in response to a determination that context of the data processing system has changed, automatically modifying the set of content items to be presented, based at least in part on the changed context.

(F7) A method according to paragraph F1 further comprises automatically determining a set of container objects to be presented in a family channel, based at least in part on predetermined user settings; organizing at least some of the content items into the container objects; automatically determining whether context for the data processing system has changed; and in response to a determination that context for the data processing system has changed, dynamically changing the set of container objects to be presented in the family channel.

(F8) In a method according to paragraph F1, the set of content items comprises at least two items from the group consisting of a stock ticker, a photo, a video, a music file, a news feed, a family calendar, a family favored photo, a family favored video, a family favored music file, a health update, a school web site, a teacher update, a note from one individual user to the family, and an entertainment application.

(G) Furthermore, the features of paragraph A1 may be combined with the features described in any one or more of paragraphs A2 through A12, B1 through B12, C1 through C8, D1 through D8, E1 through E7, and F1 through F8. Also, the features of paragraph B1 may be combined with the features described in any one or more of paragraphs A1 through A12, B2 through B12, C1 through C8, D1 through D8, E1 through E7, and F1 through F8. Also, the features of paragraph C1 may be combined with the features described in any one or more of paragraphs A1 through A12, B1 through B12, C2 through C8, D1 through D8, E1 through E7, and F1 through F8. Also, the features of paragraph D1 may be combined with the features described in any one or more of paragraphs A1 through A12, B1 through B12, C1 through C8, D2 through D8, E1 through E7, and F1 through F8. Also, the features of paragraph E1 may be combined with the features described in any one or more of paragraphs A1 through A12, B1 through B12, C1 through C8, D1 through D8, E2 through E7, and F1 through F8. Also, the features of paragraph F1 may be combined with the features described in any one or more of paragraphs A1 through A12, B1 through B12, C1 through C8, D1 through D8, E1 through E7, and F2 through F8.

(H) At least one machine accessible medium comprises technology to facilitate multi-user interaction with a data processing system. The machine accessible medium comprises instructions which, when executed by a data processing system, cause the data processing system to perform the operations (or combination of operations) described in any of paragraphs A1 through A12, B1 through B12, C1 through C8, D1 through D8, E1 through E7, F1 through F8, and G.

(I) A data processing system comprises technology to facilitate multi-user interaction. The data processing system comprises a processor and at least one machine accessible medium responsive to the processor. The machine accessible medium comprises instructions which, when executed by the data processing system, cause the data processing system to perform the operations (or combination of operations) described in any of paragraphs A1 through A12, B1 through B12, C1 through C8, D1 through D8, E1 through E7, F1 through F8, and G.

(J) For purposes of establishing initial parameters to guide examination of the present application—and without disclaiming, for purposes of rights to be secured with subsequent applications or with further prosecution of the present application, embodiments that may depart in some degree from these initial parameters—what is claimed are all implementations that come within the scope of the claims set forth in the "Claims" section, and all equivalents to such implementations.

APPENDIX A

Mobile Device Position Detection

In some embodiments, a first device may be a mobile device, such as, but not limited to, a tablet, smart phone, laptop, gaming console, portable media player, personal navigation device, personal digital assistant, or other mobile device. The first device may be moved by the user of the first device. For example, the first device may be a smart phone and the user may place the first device in proximity to the second device. Once within the proximity of the second device, the first device may be configured to determine the relative position of the first device with respect to the second device.

By determining the relative position of the first device with respect to the second device, in some embodiments, a user of the first device may transfer data between the first and second devices using intuitive gestures. For example, if the first device is a tablet with a touch screen, the user of the first device may share a music file with the second device by pushing the music file toward the second device on the screen of the first device. The first device may recognize that the user is pushing the music file toward the second device because the relative position of the second device with respect to the first device is known to the first device. The first device may send the music file to the second device through a previously established communication channel or through a communication channel that is then established between the first and second devices. The above scenario is just one example of how the first device may use the information of the relative position of the second device with respect to the first device.

The first device may include a processor, sensor, and a distance determination module, all of which may be used to determine the relative position of the first device with respect to the second device. Once the first device is within the proximity of the second device, the distance determination module may calculate a first distance between the first device and the second device.

The distance determination module may be configured to calculate the first distance between the first and second devices using multiple methods. For example, in some embodiments, the distance determination module may use ultrasonic sound waves to calculate the distance between the first and second modules. In some embodiments, the distance determination module may emit an ultrasonic sound wave and based on the time of a reflection from the second device, the first distance may be calculated. Alternately or additionally, the distance determination module may emit an ultrasonic sound wave and based on the time for the sound wave to be received by the second device, the first distance may be calculated.

In some embodiments, the distance determination module may use radio frequency signal strengths to calculate the first distance between the first and second devices. For example, in some embodiments, the first and second devices may be communicating using a Bluetooth or other direct wireless communication link, such as wireless universal serial bus (USB) or wireless USB on-the-go. In these and other embodiments, based on the signal strength of the communication link, the first distance between the first and second devices may be calculated. In some embodiments, the first and second devices may be connected to a channel of a wireless network. In these and other embodiments, the first distance between the first and second devices may be calculated based on the radio frequency strengths of a signal transmitted between the first and second devices, such as a beacon. In some embodiments, other methods or techniques may be used to calculate the first distance between the first and second devices. After calculating the first distance, the sensor may be configured to sense a movement of the first device and generate movement data. Using the movement data, the sensor, the processor, or some other module within the first device may be configured to determine a direction of the movement of the first device. For example, in some embodiments, the sensor may be an accelerometer. The accelerometer may sense the acceleration of the first device and generate acceleration data. Using the acceleration data, a module with the first device, such as the processor, the sensor, or some other module, may determine the direction of the movement of the first device. In some embodiments, the sensor may be more than one sensor. For example, the sensor may include an accelerometer and a gyroscope. Data may be collected from both the accelerometer and the gyroscope to determine the direction of the movement of the first device. In some embodiments, the sensor may be another type of sensor capable of generating data that may be used to determine the direction of movement of the first device.

In an example scenario, the first device may be moved toward the second device. After the movement of the first device, a second distance between the first device and the second device is calculated using the distance determination module. The distance determination module may calculate the second distance in the same manner as the first distance was calculated or in a different manner.

In some embodiments, after calculating the first distance, the second distance, and the direction of the movement of the first device, the processor may be configured to use the first distance, the second distance, and the direction of the movement of the first device to determine the relative location of the first device with respect to the second device. In particular, the processor may determine the relative location of the first device by analyzing the change in distance between the first and second devices, as determined by the difference between the first distance and the second distance and the direction of the movement of the first device.

In some embodiments, the methods or techniques used to calculate the first and second distances may not produce accurate distance measurements between the first and second devices. In these and other embodiments, the first and second distances may be approximate distances between the first and second devices. The method and techniques used to calculate the first and second distances need only be accurate enough to allow for the determination of the relative position of the first device with respect to the second device.

In some embodiments, the first and second devices may lie within the xy plane separated by the first distance. The first device may move within the xy plane in the −x direction, that is the first device may move toward the second device along the x-axis. Because the distance between the first and second devices decreased, the processor may determine that the second device is located in the direction of movement of the first device, that is the −x direction, with respect to the first device. Based on this information, the processor may also determine that the first device is located in the +x direction with respect to the second device.

In another scenario, the first device may move in the +x direction, and the second distance measured after the movement of the first device may be larger than the first distance. Because the distance between the first and second devices increased, the processor may determine that the second device is located in the opposite direction of the movement of the first device, that is the −x direction, with respect to the first device. Based on this information, the processor may also determine that the first device is located in the +x direction with respect to the second device.

Further information may assist in determining the relative position of the first device with respect to the second device. For example, the sensor may determine the direction of the movement of the first device and a distance moved by the first device. The distance and direction of the movement of the first device along with the first and second distances may allow the processor to determine more accurately the relative positions of the first and second devices.

In some embodiments, the first device may contain an orientation sensor A and the second device may contain an orientation sensor B. The orientation sensors A, B may be configured to determine the orientations of the first device and the second device respectively. In some embodiments, the orientation sensors A, B may share a similar coordinate frame of reference. For example, in some embodiments, the orientation sensors A, B may be compass sensors that determine the orientation of the first and second devices based on a coordinate system using the directions of north, south, east, and west. Using the coordinate frame of reference of the orientation sensor A, a common coordinate frame of reference for the sensor may be also determined. Using this common coordinate frame of reference, the relative direction of movement of the first device may be communicated to the second device and/or other device even if the second device and/or other device do not share a similar orientation. Furthermore, using a common coordinate frame of reference, the relative position of the first device with respect to the second device may be shared with the second device and/or other devices to enable the second device and/or other devices to determine their relative position with respect to the first device even if first and second device and/or other devices do not share a similar orientation.

Additionally, the granularity and accuracy of the information used by the processor, such as the first and second distances and the direction and distance of the movement of the first device, may determine the accuracy of the determined relative positions of the first and second devices. For example, in some embodiments, the relative positions of the first and second devices may be determined to be one of four general directions, such as +x, −x, +y, −y. In other embodiments, the relative positions of the first and second devices may be determined to be one of eight general directions, such as +x, −x, +y, −y, +x+y, −x+y, +x−y, +x−y. In other embodiments, the relative positions of the first and second devices may be determined to be one of six general directions, such as +x, −x, +y, −y, −z, +z. It is noted that numerous other combinations and numbers of general directions for the relative positions of the first and second devices may be possible based on the granularity and accuracy of the information used by the processor.

In some embodiments, the processor, sensor, and/or the distance determination module may be combined in a single module or may be individual modules within the first device. In some embodiments, the processor, sensor, and the distance determination module may be used by the first device to perform operations other than determining the relative positions of the first and second devices. In some embodiments, the distance determination module and the processor may be implemented in hardware, firmware, and/or software.

In some embodiments, the second device may be a mobile device or a stationary device, such as a desktop computer, smart television, or other stationary electronic device. In some embodiments, a communication link between the first and second devices may be established before, during, or after the relative positions of the first and second devices are determined. The communication link may be a wireless communication link or a wired communication link. In some embodiments, the first device may send the determined relative position of the second device with respect to the first device to the second device.

In some embodiments, the first device may include more than one sensor. For example, in some embodiments, the first device may include two or more sensors that may be used in combination or individually to determine a direction of movement of the first device.

One example system includes a first device and a second device. The first device includes an antenna A, a processor, and a sensor. The second device includes an antenna B.

In some embodiments, the first and second devices may be communicating over a channel within a wireless network. As part of communicating over the wireless network, the first and second devices may be transmitting wireless network signals. For example, if the wireless network is an 802.11 wireless network, the wireless network signal may be a beacon signal. The wireless network signal may contain data therein. For example, in some embodiments, the wireless network signal may include the signal strength of the wireless network signal when transmitted. In some embodiments, the wireless network signal may also include the media access control (MAC) address of the device transmitting the wireless signal.

Being part of the same channel within a wireless network, the first device may receive a wireless network signal from the second device that may not be directly intended for the first device or a direct communication with the first device. Likewise, in some embodiments, the second device may receive a wireless network signal from the first device that may not be directly intended for the second device or a direct communication with the second device.

Using the information within the wireless network signal, first device may determine the transmission signal strength of the wireless network signal. The transmission signal strength may be the strength of the wireless network signal when the wireless network signal is first broadcast by the antenna B of the second device. The first device may also determine the received signal strength of the wireless network signal when the wireless network signal is received by the antenna A of the first device. The received signal strength may be the strength of the wireless network signal at the antenna A when received by the first device.

Using the strength of the wireless network signal at transmission and reception, the processor in the first device may calculate a first distance between the first and second devices. In these and other embodiments, the first and second devices may be close enough to each other so that the antenna A is in a location where a line of sight signal of the wireless network signal is the dominant signal. In some embodiments, where the antenna A is in a location where the reflective signal of the wireless network signal is the dominant signal, other means may be used to calculate a distance between the first and second devices.

After determining the first distance between the first and second devices, the first device may determine a direction of a movement of the first device using the sensor. In some embodiments, the sensor may be an accelerometer that produces acceleration data representing the acceleration of the first device. The processor or some other module within the first device may determine the direction of the movement of the first device based on the acceleration data. For instance, the first device may move from an original position in a +x direction from the second device to a second position farther away from the second device in the +x direction.

The processor may then use the transmission and reception strength of a wireless network signal transmitted and received after the first device is in the second position to calculate a second distance between the first and second devices. With the calculated first and second distances and the direction of the movement of the first device, the processor may determine the relative position of the first device with respect to the second device in a similar fashion as described above. Thus, in some embodiments, the relative position of the first device with respect to the second device may be determined when each of the first and second devices contain a single antenna, A, B.

In some embodiments, the first and/or second distances used to determine the relative position between the first and second device may be based on one or more calculated distances between the first and second devices. For example, before the movement of the first device, the first device may calculate a first distance between the first and second devices multiple times using multiple wireless network signals. For example, the first device may receive five wireless network signals from the second device and may calculate the first distance five times before the movement of the first device. In some embodiments, the first distance used by the processor to determine the relative position of the first device with respect to the second device may be the mean, medium, weighted mean, or some other combination or subset combination of the five calculated first distances. For example, the first distances used by the processor to determine the relative position of the first and second devices may be the mean of the first distances that are within one standard deviation of the mean of the five calculated first distances. In other embodiments, the first distance used by the processor may be the shortest or longest of the five calculated first distances.

In some embodiments, after determining the relative position of the second device, the first device may establish a communication link between the first and second devices. In some embodiments, the first device may establish the communication link using the MAC address obtained from the beacon transmitted by the second device. Establishing the communication link may allow the first and second devices to share data. The communication link may also allow the first device to share the relative position of the first device with respect to the second device with the second device. For example, in some embodiments, the first and second devices may share data as directed by intuitive gestures by users of the first and second devices.

In some embodiments, the first device may send the first and second distances and the direction of movement of the first device to another device for processing and determining the relative position of the first and second device. Alternately or additionally, another device besides the first device may calculate the first or second distances or the direction of movement of the first device. The other device may receive information from the first device necessary to determine the first and second distances and the direction of movement of the first device. In some embodiments, the processor may be implemented in hardware, firmware, and/or software.

One example scenario involves a mobile device and three other devices: device A, device B, and a device C. The mobile device may be a device similar to the device referred to above as the first device. For instance, the mobile device may be configured to determine the relative positions of the device A, device B, and the device C with respect to the mobile device.

In some embodiments, the mobile device and the devices A, B, C may be operating on the same channel within a wireless network. The mobile device may determine the relative positions of the devices A, B, C using a wireless network signal received from the devices A, B, C similar to how the mobile device determined the relative position of the second device with respect to FIG. 2. For example, the mobile device may determine that the device A is in the +y direction, that the device B is in the +x direction, and that the device C is in the −y direction. The mobile device may associate the MAC addresses of the devices A, B, C with their relative positions and establish a communication link with the devices A, B, C. A user of the mobile device may transfer data to device A by pushing the data in the +y direction along a screen of the mobile device. Likewise, the user of the mobile device may transmit data to device B by pushing data in the +x direction along the screen and may transmit data to the device C by pushing data in the −y direction along the screen.

In some embodiments, one or more of the devices A, B, C may be mobile devices. In these and other embodiments, the mobile device may not establish a communication link with the devices A, B, C until prompted by a user of the mobile device. The mobile device may be prompted to establish a communication link to transfer data with the device A, for example, by the user moving the mobile device in the +y direction toward the device A. A connection may be established if a user of device A also moves the device A in a −y direction toward the mobile device. In some embodiments, a communication link to transfer data may be established if the movements of the mobile device and the device A occur with a predetermined period, such as 1 second, 1.5 seconds, 3 seconds, or some other period.

An example method may be used to describe operations performed, for example, by the devices described above as the first device and the second device. For one operation, a first distance between first and second devices is calculated. The first distance may be calculated by either the first device, the second device, or some other device. The first distance may be calculated using one or more methods. For example, in some embodiments, ultrasonic sound waves emitted by either the first or the second device may be used to calculate the distance. Alternately or additionally, a signal emitted from one of the first and second devices and received by the other of the first and second devices may be used to determine the distance between the first and second devices. For example, in some embodiments, the second device may emit a wireless network signal used within a wireless communication network. For example, in some embodiments, the wireless network signal may be a beacon signal that contains the transmission strength of the beacon signal. Based on the strength of the signal when received by the first device and the strength of the signal with transmitted by the second device, the distance between the first and second devices may be calculated.

A direction of a movement of the first device may then be determined. In some embodiments, determining the direction of the movement may include sensing the direction of the movement using at least one sensor within the first device. In some embodiments, the sensor may be an accelerometer. In these and other embodiments, sensing the direction of movement of the first device may include sensing acceleration or other movement and generating movement data representing the movement of the first device. The direction of movement may then be derived from the movement data generated by the sensor. In some embodiments, the sensor may derive the direction from the movement data. Alternately or additionally, a processor or other module within the first device or some other device, such as the second device that receives the movement data, may derive the direction from the movement data.

A second distance between the first and second devices may be calculated after the movement of the first device. The second distance may be calculated by either the first device, the second device, or some other device. The second distance may be calculated using one or more methods as described above. In some embodiments, the same method used to calculate the first distance may be used to calculate the second distance. In some embodiments, a different method may be used to calculate the second distance.

Then, the relative position of the first device with respect to the second device is determined based on the direction of the movement and the calculated first and second distances. The relative position may be determined by the first device, second device, or some other device. In some embodiments, the relative position may be determined by analyzing a difference in the distance between the first and second devices after the movement of the first device and the direction of the movement of the first device.

In some embodiments, the accuracy of the determined relative position may depend on the granularity and accuracy of the information used to determine the relative position, namely the direction of the movement and the calculated first and second distances. For example, if the direction of the movement may only be determined in four general directions within a plane, then the relative position may be determined based on the four general directions within the plane.

In some embodiments, the method may be performed by the first device, the second device, some other device, or some combination thereof. In some embodiments, the first and/or second device may be mobile devices, such as, tablets, smart phones, laptops, gaming consoles, portable media players, personal navigation devices, personal digital assistants, or other mobile devices. In some embodiments, each of the first and second devices may include a single wireless antenna.

In some embodiments, the method may further include additional actions. For example, if the first device determined the relative position of the first and second devices, the method may include sending the relative position of the first and second devices to the second device. Alternately or additionally, the method may include passing information between the first and second devices based on user input related to the relative position of the first and second devices.

In another example method, a second device may receive a first wireless network signal from a first device. In some embodiments, the first device may send a wireless network signal, such as a beacon signal, on a channel within a wireless communication network. The wireless network signal may include data therein, including the signal strength of the wireless network signal when transmitted by the first device. The second device may be connected to the channel within the wireless communication network and may receive the wireless network signal and obtain the data within the wireless network signal. The second device may also calculate the signal strength of the first wireless network signal when received at the second device.

In addition a direction of a movement of the second device may be determined using at least one sensor within the second device. For example, in some embodiments, the sensor within the second device may be an accelerometer. The second device may receive acceleration data from the accelerometer and determine therefrom the direction of the movement of the second device.

The second device may then receive a second wireless network signal from the first device after the movement of the second device. The second device may obtain the data within the second wireless network signal. The second device may also calculate the signal strength of the second wireless network signal when received at the second device.

The relative position of the first device with respect to the second device may then be determined based on the direction of the movement of the second device, the first wireless network signal, and the second wireless network signal In some embodiments, a first distance between the first and second devices may be calculated using data within the first wireless network signal and a second distance between the first and second device may be calculated using data within the second wireless network signal. For example, in some embodiments, the first distance may be calculated using the difference between the transmission signal strength of the first wireless signal at the first device and the reception signal strength of the first wireless signal at the second device. Similarly, in some embodiments, the second distance may be calculated using the difference between the transmission signal strength of the second wireless signal at the first device and the reception signal strength of the second wireless signal at the second device.

Based on the calculated first and second distances and the direction of the movement of the second device, the relative position of the first device with respect to the second device may be determined. In some embodiments, the relative position may be determined by analyzing a difference in the distance between the first and second devices after the movement of the first device and the direction of the movement of the first device.

In some embodiments, the calculations performed in the method may be performed by the first device, the second device, some other device, or some combination thereof. In some embodiments, the first and/or second device may be mobile devices, such as, tablets, smart phones, laptops, gaming consoles, portable media players, personal navigation devices, personal digital assistants, or other mobile devices. In some embodiments, each of the first and second devices may include a single wireless antenna.

What is claimed is:

1. A method for facilitating multi-user computer interaction, comprising:
   automatically determining a first set of content items for a home screen of a first user of a data processing system, based at least in part on a user profile for the first user;
   automatically determining a second set of content items for a home screen of a second user, based at least in part on a user profile for the second user, wherein the first user and the second user are individual users;
   automatically determining a third set of content items for a home screen of a family user, based at least in part on a user profile for the family user, wherein the family user is a collective user;
   enabling the first user to change settings in the first user profile;
   protecting the first user profile from changes by the second user;
   enabling the second user to change settings in the second user profile;
   protecting the second user profile from changes by the first user;
   enabling both the first user and the second user to change settings in the family user profile;
   automatically updating the user profile for the family user, based on a change to the settings in the first user profile;
   presenting the first set of content items on the home screen for the first user in response to the first user is signing in;
   after presenting the first set of content items on the home screen for the first user, automatically determining whether the first user has handed the data processing system to another person without signing out;
   in response to determining that the first user has handed the data processing system to another person without signing out, automatically determining an identity of the other person and automatically presenting a transfer interface that provides at least four different transfer options, wherein the transfer interface enables the other person to select and complete any of at least four different transfer options with no more than a single gesture of a single finger,
   wherein, when the other person comprises the second user, the at least four different transfer options comprise:
   a no-transition option, to cause the first user profile to be kept open,
   a complete-transition option, to cause the first user to be automatically signed out and the second user signed in,
   a temporary-transition option, to cause the second user to be temporarily signed in without signing the first user out, wherein the temporary-transition option, when selected, allows the second user to send content from an account for the second user to an account for the first user, and
   a shared-transition option, to cause the data processing system to make content recommendations based on both the first and second user profiles; and
   if the temporary-transition option has been selected:

automatically determining whether the second user has handed the data processing system back to the first user; and automatically signing out the second user while leaving the first user signed in, in response to the determining that the second user has handed the data processing system back to the first user.

2. A method according to claim 1, wherein:

the transfer interface presents a first identifier for the first user and second identifier for the second user;

the transfer interface enables the second user to select and complete the no-transition option by swiping the identifier for the second user off the screen;

the transfer interface enables the second user to select and complete the complete-transition option by swiping the identifier for the first user off the screen;

the transfer interface enables the second user to select and complete the temporary-transition option by touching the identifier for the second user without swiping the identifier for the second user off the screen; and the transfer interface enables the second user to select and complete the shared-transition option by dragging the identifier for the second user towards a central location.

3. A method according to claim 1, further comprising:
automatically determining whether all individual user profiles are inactive; and
automatically presenting the family channel in response to a determination that all individual user profiles are inactive.

4. A method according to claim 1, further comprising:
before the first user has handed the data processing systems to another person, presenting at least one recommendation from a first set of recommendations for content predicted to be of interest to the first user; and
in response to selection of the shared-transition option, automatically presenting at least one recommendation from a second set of recommendations for content predicted to be of interest to the first user and the second user.

5. A method according to claim 1, wherein the data processing system comprises multiple content items, an individual user account for the first user, an individual user account for the second user, and a family user account that corresponds to the family user profile, and the method further comprises:

opening one of the individual user accounts in response to a current user signing in to the data processing system;

in response to a determination that the current user has selected a content item among the multiple content items for sharing, presenting one or more selectable user identifiers for one or more other individual users and presenting a selectable user identifier for the family user;

in response to determining that the current user has selected the user identifier for the family user, automatically modifying the family user profile to identify the selected content item as having been shared with the family user; and when the family user account is open, displaying a home screen for the family user that contains information about the selected content item that was shared with the family user.

6. At least one non-transitory machine accessible medium comprising computer instructions for facilitating multi-user computer interaction, wherein the computer instructions, in response to being executed on a data processing system, enable the data processing system to:

automatically determine a first set of content items for a home screen of a first user, based at least in part on a user profile for the first user, wherein the first user is an individual user;

automatically determine a second set of content items for a home screen of a second user, based at least in part on a user profile for the second user, wherein the first user and the second user are individual users;

automatically determine a third set of content items for a home screen of a family user, based at least in part on a user profile for the family user, wherein the family user is a collective user;

enable the first user to change settings in the first user profile, but protect the first user profile from changes by the second user;

enable the second user to change settings in the second user profile but protect the second user profile from changes by the first user;

enable both the first user and the second user to change settings in the family user profile;

automatically update the user profile for the family user, based on a change to the settings in the first user profile;

present the first set of content items on the home screen for the first user in response to the first user is signing in;

after presenting the first set of content items on the home screen for the first user, automatically determine whether the first user has handed the data processing system to another person without signing out;

in response to determining that the first user has handed the data processing system to another person without signing out, automatically determine an identity of the other person and automatically present a transfer interface that provides at least four different transfer options, wherein the transfer interface enables the other person to select and complete any of at least four different transfer options with no more than a single gesture of a single finger, wherein, when the other person comprises the second user, the at least four different transfer options comprise:

a no-transition option, to cause the first user profile to be kept open, a complete-transition option, to cause the first user to be automatically signed out and the second user signed in, a temporary-transition option, to cause the second user to be temporarily signed in without signing the first user out, wherein the temporary-transition option, when selected, allows the second user to send content from an account for the second user to an account for the first user, and a shared-transition option, to cause the data processing system to make content recommendations based on both the first and second user profiles; and if the temporary-transition option has been selected:

automatically determine whether the second user has handed the data processing system back to the first user; and automatically sign out the second user while leaving the first user signed in, in response to the determining that the second user has handed the data processing system back to the first user.

7. At least one non-transitory machine-accessible medium according to claim 6, wherein:

the transfer interface presents a first identifier for the first user and second identifier for the second user;

the transfer interface enables the second user to select and complete the no-transition option by swiping the identifier for the second user off the screen;

the transfer interface enables the second user to select and complete the complete-transition option by swiping the identifier for the first user off the screen;

the transfer interface enables the second user to select and complete the temporary-transition option by touching the identifier for the second user without swiping the identifier for the second user off the screen; and the transfer interface enables the second user to select and complete the shared-transition option by dragging the identifier for the second user towards a central location.

8. At least one non-transitory machine-accessible medium according to claim 6, wherein the computer instructions further enable the data processing system to:

automatically determine whether all individual user profiles are inactive; and automatically present the family channel in response to a determination that all individual user profiles are inactive.

9. At least one non-transitory machine-accessible medium according to claim 6, wherein the computer instructions further enable the data processing system to:

before the first user has handed the data processing systems to another person, present at least one recommendation from a first set of recommendations for content predicted to be of interest to the first user; and in response to selection of the shared-transition option, automatically present at least one recommendation from a second set of recommendations for content predicted to be of interest to the first user and the second user.

10. At least one non-transitory machine-accessible medium according to claim 6, wherein the data processing system comprises multiple content items, an individual user account for the first user, an individual user account for the second user, and a family user account that corresponds to the family user profile, and the computer instructions further enable the data processing system to:

open one of the individual user accounts in response to a current user signing in to the data processing system;

in response to a determination that the current user has selected a content item among the multiple content items for sharing, present one or more selectable user identifiers for one or more other individual users and presenting a selectable user identifier for the family user;

in response to determining that the current user has selected the user identifier for the family user, automatically modify the family user profile to identify the selected content item as having been shared with the family user; and when the family user account is open, display a home screen for the family user that contains information about the selected content item that was shared with the family user.

11. A data processing system comprising:

a processing element;

at least one non-transitory machine accessible medium responsive to the processing element; and computer instructions in the machine accessible medium which, when executed by the processing element, enable the data processing system to:

automatically determine a first set of content items for a home screen of a first user, based at least in part on a user profile for the first user, wherein the first user is an individual user;

automatically determine a second set of content items for a home screen of a second user, based at least in part on a user profile for the second user, wherein the first user and the second user are individual users;

automatically determine a third set of content items for a home screen of a family user, based at least in part on a user profile for the family user, wherein the family user is a collective user;

enable the first user to change settings in the first user profile, but protect the first user profile from changes by the second user;

enable the second user to change settings in the second user profile but protect the second user profile from changes by the first user;

enable both the first user and the second user to change settings in the family user profile;

automatically update the user profile for the family user, based on a change to the settings in the first user profile;

present the first set of content items on the home screen for the first user in response to the first user is signing in;

after presenting the first set of content items on the home screen for the first user, automatically determine whether the first user has handed the data processing system to another person without signing out;

in response to determining that the first user has handed the data processing system to another person without signing out, automatically determine an identity of the other person and automatically present a transfer interface that provides at least four different transfer options, wherein the transfer interface enables the other person to select and complete any of at least four different transfer options with no more than a single gesture of a single finger, wherein, when the other person comprises the second user, the at least four different transfer options comprise:

a no-transition option, to cause the first user profile to be kept open, a complete-transition option, to cause the first user to be automatically signed out and the second user signed in, a temporary-transition option, to cause the second user to be temporarily signed in without signing the first user out, wherein the temporary-transition option, when selected, allows the second user to send content from an account for the second user to an account for the first user, and a shared-transition option, to cause the data processing system to make content recommendations based on both the first and second user profiles; and if the temporary-transition option has been selected:

automatically determine whether the second user has handed the data processing system back to the first user; and automatically sign out the second user while leaving the first user signed in, in response to the determining that the second user has handed the data processing system back to the first user.

12. A data processing system according to claim 11, wherein:

the transfer interface presents a first identifier for the first user and second identifier for the second user;

the transfer interface enables the second user to select and complete the no-transition option by swiping the identifier for the second user off the screen;

the transfer interface enables the second user to select and complete the complete-transition option by swiping the identifier for the first user off the screen;

the transfer interface enables the second user to select and complete the temporary-transition option by touching the identifier for the second user without swiping the identifier for the second user off the screen; and the transfer interface enables the second user to select and complete the shared-transition option by dragging the identifier for the second user towards a central location.

13. A data processing system according to claim 11, wherein the computer instructions further enable the data processing system to:
   automatically determine whether all individual user profiles are inactive; and
   automatically present the family channel in response to a determination that all individual user profiles are inactive.

14. A data processing system according to claim 11, wherein the computer instructions further enable the data processing system to:
   before the first user has handed the data processing systems to another person, present at least one recommendation from a first set of recommendations for content predicted to be of interest to the first user; and
   in response to selection of the shared-transition option, automatically present at least one recommendation from a second set of recommendations for content predicted to be of interest to the first user and the second user.

15. A data processing system according to claim 11, further comprising:
   multiple content items, an individual user account for the first user, an individual user account for the second user, and a family user account that corresponds to the family user profile; and
   wherein the computer instructions further enable the data processing system to:
   open one of the individual user accounts in response to a current user signing in to the data processing system;
   in response to a determination that the current user has selected a content item among the multiple content items for sharing, present one or more selectable user identifiers for one or more other individual users and presenting a selectable user identifier for the family user;
   in response to determining that the current user has selected the user identifier for the family user, automatically modify the family user profile to identify the selected content item as having been shared with the family user; and
   when the family user account is open, display a home screen for the family user that contains information about the selected content item that was shared with the family user.

* * * * *